May 7, 1935.　　　　J. W. GRAY　　　　2,000,132
SHOCK ABSORBER
Filed June 4, 1929　　　8 Sheets-Sheet 1
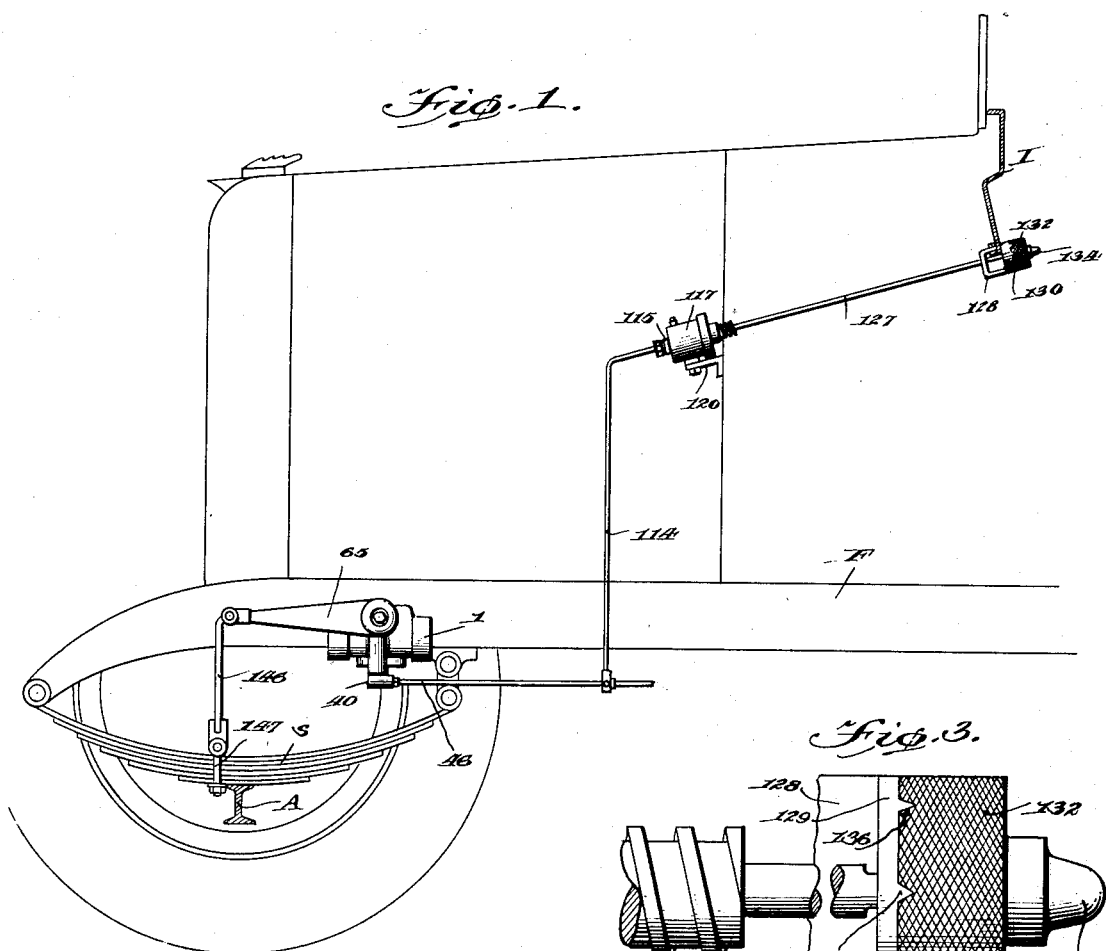
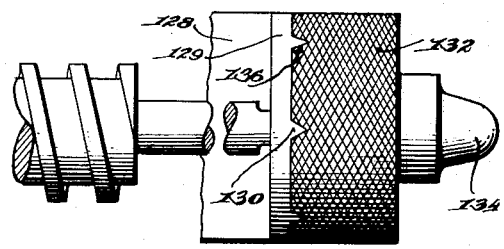
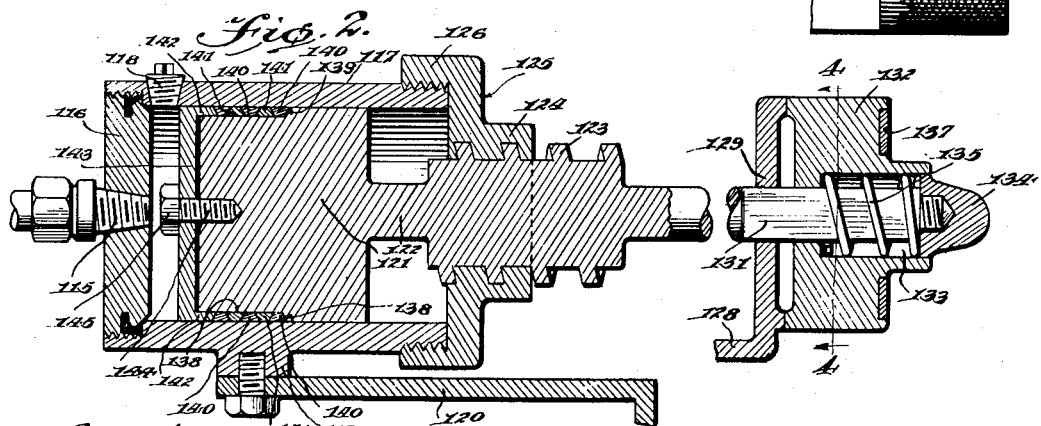
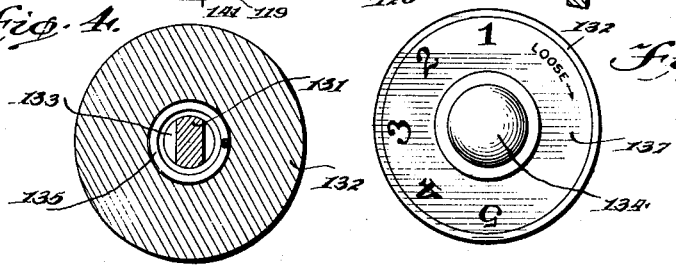
INVENTOR
J. W. Gray
BY
ATTORNEY May 7, 1935.  J. W. GRAY  2,000,132
SHOCK ABSORBER
Filed June 4, 1929　　8 Sheets-Sheet 2
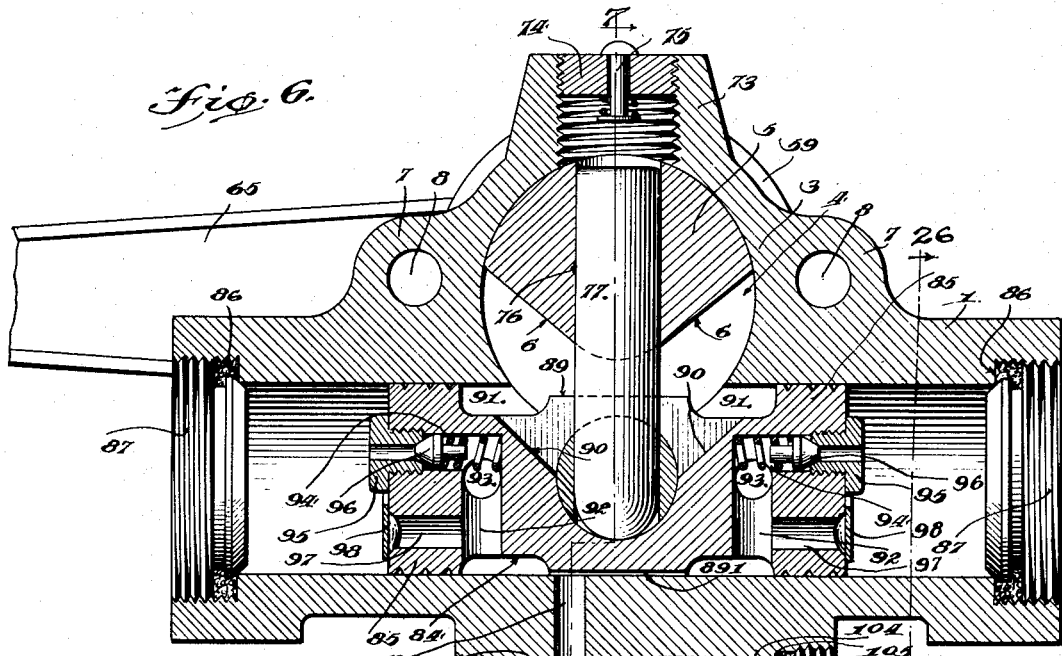
Fig. 6.
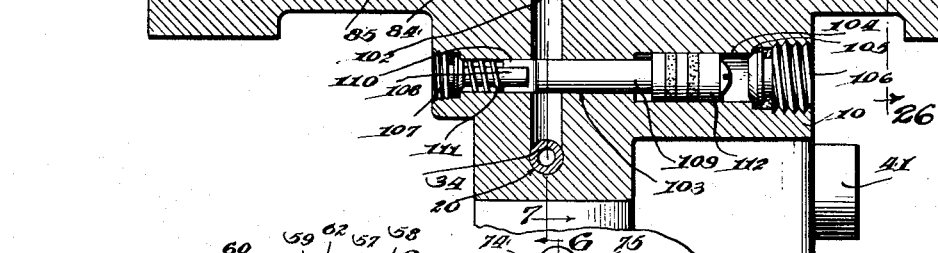
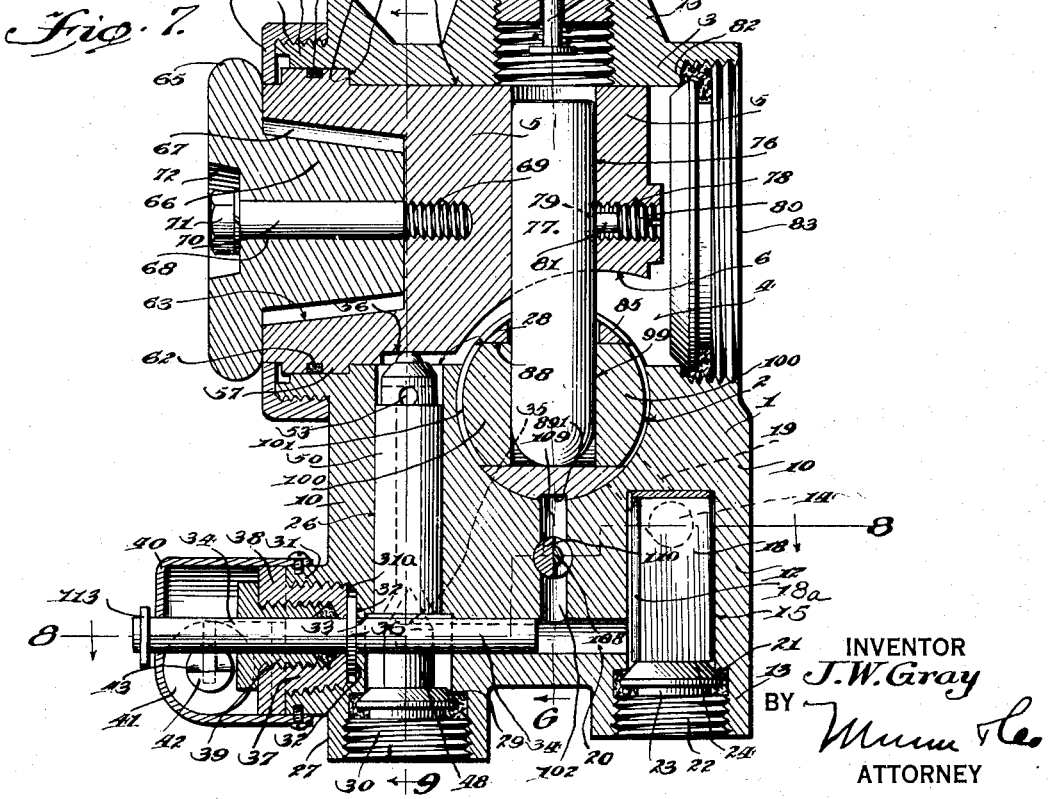
Fig. 7.
INVENTOR
J. W. Gray
BY
ATTORNEY

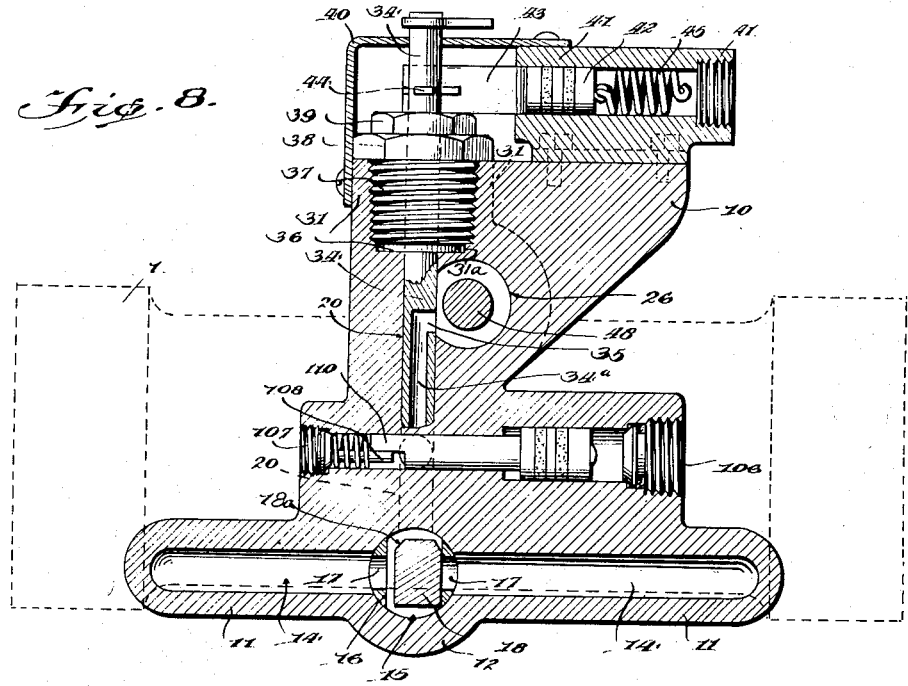

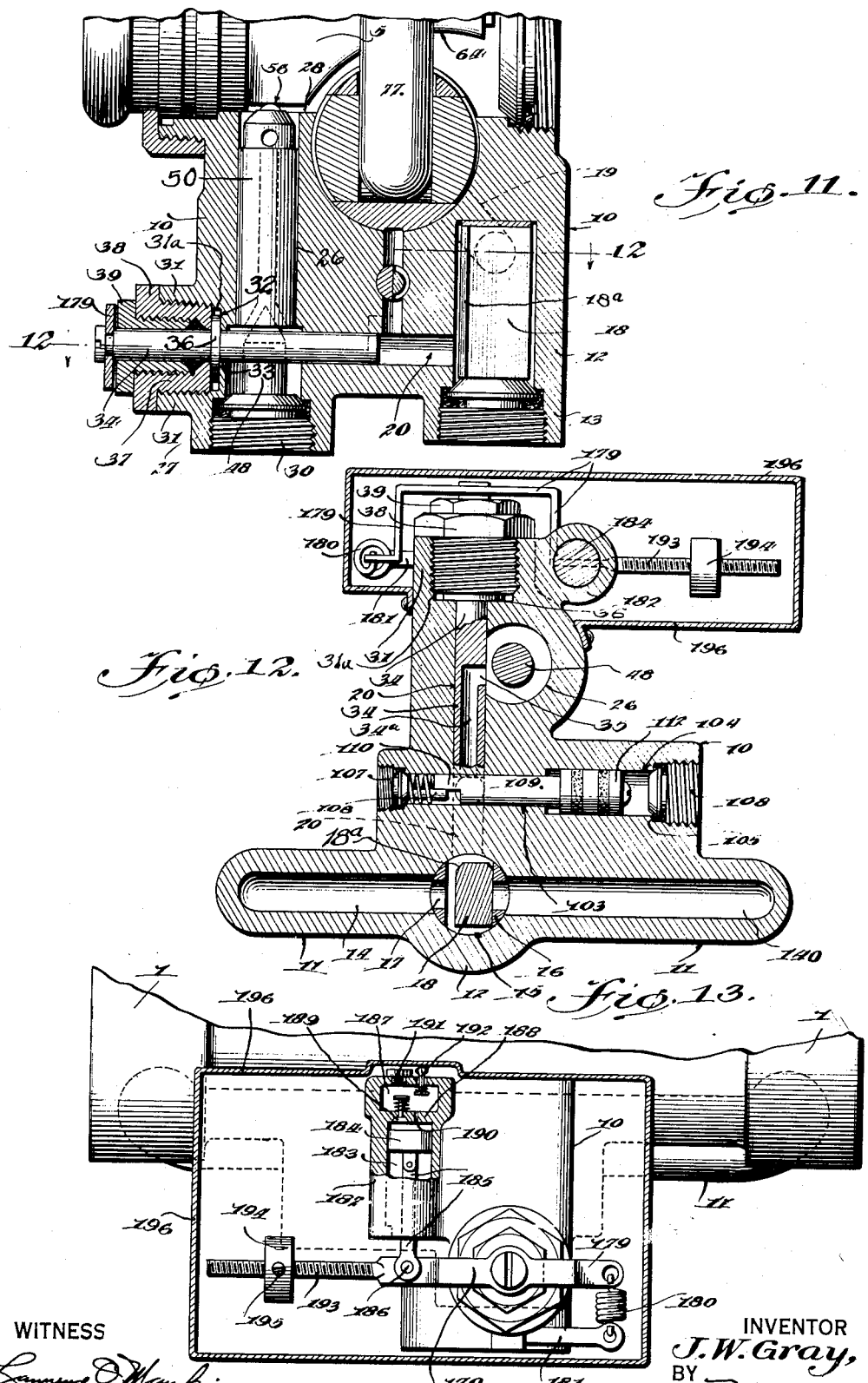

May 7, 1935.  J. W. GRAY  2,000,132
SHOCK ABSORBER
Filed June 4, 1929   8 Sheets-Sheet 5

WITNESS
INVENTOR
J. W. Gray
BY
ATTORNEY

May 7, 1935. J. W. GRAY 2,000,132
SHOCK ABSORBER
Filed June 4, 1929 8 Sheets-Sheet 6

WITNESS
Lawrence D. Hawkins

INVENTOR
J. W. Gray
BY
ATTORNEY

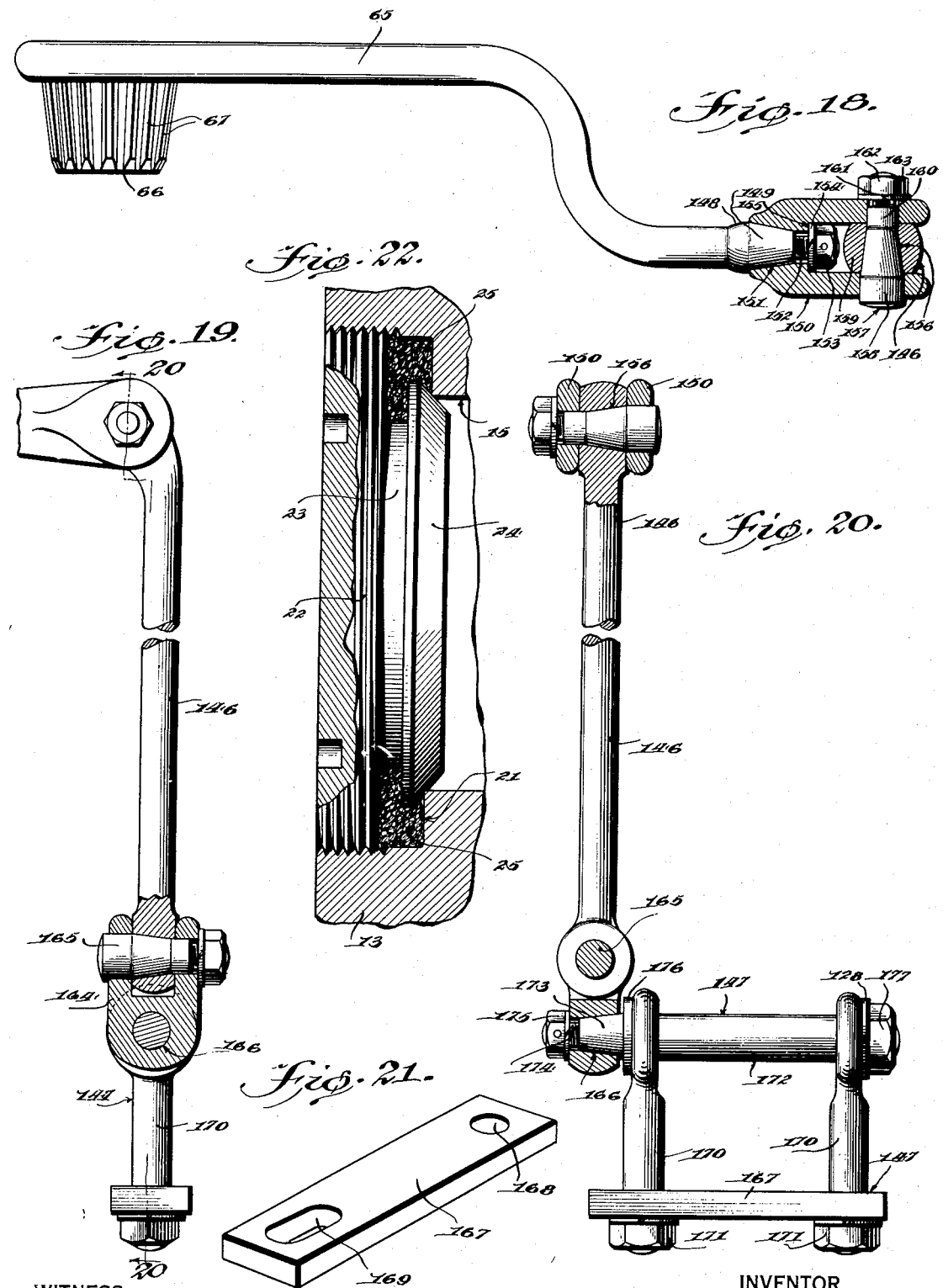

May 7, 1935.  J. W. GRAY  2,000,132
SHOCK ABSORBER
Filed June 4, 1929   8 Sheets-Sheet 8

WITNESS
INVENTOR
J. W. Gray,
BY
ATTORNEY

Patented May 7, 1935

2,000,132

UNITED STATES PATENT OFFICE 2,000,132

SHOCK ABSORBER

John W. Gray, Chattanooga, Tenn., assignor of one-half to Bernard V. Curnen, Chattanooga, Tenn.

Application June 4, 1929, Serial No. 368,264

33 Claims. (Cl. 188—88)

This invention relates to shock absorbing equipment which finds its greatest field of use in damping the motion imparted to motor vehicle bodies through depression and rebound of their springs due to road shocks and is more particularly concerned with a type of absorber in which damping action is synchronized with the progressive increase in the resistance of a laminated or multiple leaf spring to depression, and the progressive decrease of the resultant stored tension energy of spring upthrow on rebound to normal, the damping action applied by the absorber being operated through spring movement and applying progressively increasing damping action in synchronism with and in proportion to the increase in resistance of a laminated spring on depression, and progressively reducing damping action as the spring returns to normal; thereafter on rebound, upwardly from normal immediately beginning progressively to dampen or restrict spring movement in synchronism with the progressively increasing resistance of the laminated spring to such upthrow; and then again on the return to normal, progressively reducing damping action proportionately to and in synchronism with the reduction of the energy stored in the spring leaves by upward rebound above normal.

This damping action therefore, provides a positive control for spring flexure by shock at all times and operates in synchronism with the speed and extent or amplitude of movement.

At the outset, in order to fully appreciate the function and relation of the shock absorber to the spring, it should be noted that in the laminated leaf spring universally used for the suspension of motor vehicles today, depression of a leaf spring by road shock causes the spring when depressed to offer progressively increased resistance to depression as its different leaves or laminations come into play and are affected by depression and coincidently through flexure of these leaf laminations progressively increases the energy stored for rebound. As these leaf laminations successively return to normal on release of pressure on the recoil of the spring, the energy of recoil or rebound progressively decreases. To damp these movements in synchronism, therefore, the shock absorber must act to increase its damping action progressively and in synchronism with the increase in resistance of the spring as it is depressed, and must progressively decrease its damping action on the rebound of the spring as its leaves successively flatten out in returning to normal; otherwise the return to normal is unduly delayed. After the normal has been passed and the spring rebounds upwardly beyond the normal, the same progressively increasing damping action proportioned and synchronized to the amplitude of spring rebound flexure must occur and correspondingly on the return from rebound to normal, damping action must progressively decrease as the energy stored in the spring leaves on rebound is progressively expended and reduced. The damping forces must be applied, synchronized both in time and amplitude to the speed of the vehicle as reflected in the period of down throw and to the extent of imparted shock as reflected in the amplitude of spring movement from the normal.

The present invention, in this respect, constitutes an important improvement in the construction of my pending application for Shock absorbers, Serial No. 312,847 in which there is no provision for synchronized damping control of the spring on rebound to normal from original depression or on rebound to normal from subsequent upward flexure above normal, and also improves its construction by reason of the greatly simplified structure through which this increased damping control is effected.

In both my pending application and the present invention, a double acting piston is employed with a communicating idle pressure fluid reservoir space to which the fluid is forced and from which it is drawn by opposite reciprocatory movements of the piston induced by flexure of the vehicle springs in opposite directions from normal. In my pending application, separate passages conduct the fluid so forced to the idle reservoir chamber and double sets of control valves are required, including automatic progressively restricting valves proportioning and synchronizing increase (only) in damping action to the speed and amplitude of spring flexure.

This dual separately operating synchronizing control provided in the shock absorber of my pending application aforesaid as shown cannot apply synchronized damping control to the rebound of the springs to normal from either depression below normal or upthrow above normal.

In accordance with my present invention, I secure complete synchronized damping control of the springs as aforesaid through the provision of a single return passage through which fluid is forced continuously in the same direction by opposite reciprocatory movements of the piston and to which passage the fluid forced by alternate piston movements is diverted in alternation, and provide a common constantly operative control in this single passage for progressively and automatically increasing and decreasing the damping action in synchronism with spring flexure and rebound, both as to factors of time or speed and extent or amplitude of spring movement. The invention as developed in this and in the other respects hereinafter noted is applicable equally to shock absorbers employing double or double acting pistons having rectilinear reciprocating movement or reciprocating in a curved path as by oscillation.

In further development of the invention, I have provided means for determinately regulating the force of the damping action by determinate control of the volume flow of the damping liquid, providing a means for proportioning the flow volume, and force of applied damping action to the character of road surfaces and the consequent severity or lack of severity, of road shocks.

This feature as developed provides for adjustment of the set of shock absorbers singly by manual adjusting control, singly or jointly by remote manual adjusting control, and individually and automatically responsively to the speed and amplitude factors of spring movement as imparted by road shock.

In the development of these features of the invention is included automatic temperature control of the volume of fluid which is permitted to pass through the controlled single passage to the idle reservoir chamber. This provision is highly desirable because of the change in viscosity, and the consequent resistance to flow, of the pressure fluid due to temperature changes induced by climate and seasons of the year. A viscous fluid has the disadvantage of increasing in viscosity at lower temperatures with a corresponding decrease in its fluidity and increase in the pressure required to flow it but since only a small volume is required to transmit requisite damping pressures, it is preferable for use over a thin non-viscous fluid which does not have this tendency to thicken under low temperatures but which requires a large volume to give the necessary controlling pressures and therefore would make the size of the housings too large for practical use in the restricted spaces available for the placement of the device on a motor vehicle. Because of the desirability and practical necessity of using a viscous fluid, an automatic compensator for change of temperature is highly desirable.

As features of the invention, I have provided compensation for increased viscosity (1) in reduction of the normal regulated volume of flow to be restricted or retarded to produce the spring damping action; (2) in prevention of regulated restriction of said normal volume, as alternative; or (3) as conjunctively operable in the specific arrangements disclosed.

This temperature control provides for a regulated volume flow of viscous liquid reduced in volume at cold temperatures below that at moderate and high atmospheric temperatures and may be by automatic thermostatic control applicable to all forms and types of the shock absorber and proportioned to the degree of heat and cold or by a freezing control maintaining full volume and preventing the automatic reduction and regulation of volume flow of the damping action responsive to the speed and amplitude factors of spring movement as imparted by shock, or by both, with the freezing control of automatic adjustment susceptible of use in conjunction with thermostatic control in the automatic type or in substitution therefor.

The automatic adjustment as thus controlled utilizes road shock imparted movement of a normally counter-balanced weight to effect restriction of normal full fluid flow volume through a valved passage in proportion to the violence of the road shock and normally retards the return of the weight and the increase of the volume of flow through the valve by means of a piston operating in a dash pot containing liquid which congeals at freezing temperatures and by its freezing, prevents normal movement of the piston and weight to restrict volume of flow. Thus by permitting free flow, where normally in warm weather it would be restricted, compensation is made for the increased resistance to movement offered by the increased viscosity of the pressure fluid in cold weather. This automatic road-shock effected regulation of the flow volume is not affected under weather conditions with the temperature above the freezing point for the dash pot cylinder liquid, and is merely stopped during freezing temperatures and unrestricted flow through the weight controlled valve is maintained, so long as the dash pot cylinder liquid remains frozen.

In the development of the invention in respect to the structure media producing the results and having the functions above described, care has been taken to provide structure capable of manufacture with economy of time, labor and material making possible mass production with low manufacturing costs and sale prices.

And since the practical efficiency of a shock absorber employing controlled fluid as a damping element, depends on its ability to contain the fluid under pressure without leakage; requires it to be compact and insertible in the small spaces available for placement without sacrifice of strength and efficiency or of adequate bearing surfaces; and requires it to reduce and so far as possible eliminate or compensate for wear of the relatively movable parts without resultant noise or the necessity of frequent compensating adjustments, structure has been developed to provide features meeting these requirements including fluid tight joints and closures including packed pistons, plungers and end closures, and automatic wear compensating and rattle preventing connections which structures will be individually treated in detail in the later discussion of the operating media.

A feature of the invention whose importance should be stressed is the arrangement and functioning of the single, synchronous, progressively increasing and decreasing, damping control valve mounted in a single fluid return passage leading back to an idle reservoir chamber from which the fluid is originally drawn, to which single passage the fluid under pressure from the piston in its opposite directions of reciprocation is diverted in alternation to produce a constant flow of fluid in the direction of the idle reservoir chamber. This control valve functions as a control piston or plunger normally urged against the direction of fluid flow by an actuating cam surface on a rotor moving coincidently with reciprocation of the piston and held by the skin friction of the constant fluid flow at all times against its activator cam, which is moved and in turn progressively moves the control valve or piston in response to and in synchronism with the spring movement as transmitted to an actuator effecting movement of the activating cam and pressure creating piston.

The damping action, therefore, at all times follows and is synchronized both as to speed and amplitude with spring movement so that complete control is had at all times. To illustrate the effect of this progressive and synchronized damping action with laminated spring as contrasted with a fixed damping force, by graphs, the latter (fixed damping) control assumes the form of a line of sharp up and down angles equivalent to a series of sharp up and down or staccato body movements; the progressive synchronized damping control is pictured by a line of long gradual and substantially uniform reverse curves producing a stream line or gently floating support of the body.

In the development of the invention along the lines above stated and in respect to its application to spring damping devices of the double acting oscillating piston type, a compact construction hereinafter described has been devised having structural characteristics of particular advantage from the standpoint of manufacture due to the substantial reduction in the heretofore large number of surfaces that have been required to be closely fitted.

The invention consists in the structural features, combinations, sub-combinations, arrangement and interrelation of parts hereinafter pointed out and claimed, and its structural media from the details will be more clearly apparent from the following detailed specification which is to be read in conjunction with the accompanying drawings forming part thereof, and in which:

Figure 1 is a view in elevation of a shock absorber of the rectilinear reciprocating piston type constructed in accordance with the present invention applied to the left front end and spring of a motor vehicle conventionally shown, and with the shock absorber mounted upon the vehicle body at the dash.

Figure 2 is a longitudinal vertical section through the remote control pressure cylinder and manual remote control adjustment on an enlarged scale, disclosing also a novel form of piston packing.

Figure 3 is a detail in plan view of the manual adjusting thumb turn and its associated worm shaft.

Figure 4 is a vertical section through the thumb turn and shaft taken on line 4—4 of Figure 2.

Figure 5 is a front elevation of the thumb turn showing operating indicia.

Figure 6 is a longitudinal vertical section through a shock absorber cylinder of the double rectilinear reciprocating piston type shown in Figure 1, taken substantially on the line of section 6—6 of Figure 7.

Figure 7 is a transverse vertical section through the shock absorber taken on line 7—7 of Figure 6 showing the connection of the remote control cylinder with the rotary fluid return passage control valve.

Figure 8 is a transverse horizontal section on line 8—8 of Figure 7 with the control valve provided with the adjusting cylinder shown in Figure 1 for operation through the remote control shown in Figures 1–5.

Figure 9 is a vertical transverse section taken on line 9—9 of Figure 7.

Figure 10 is a detail in vertical section of the cam operated plunger valve shown in Figure 9 controlling the return passage to the reservoir.

Figure 11 is a view similar to Figure 7 restricted to the lower part of the shock absorber showing provision for the automatic adjustment of said valve.

Figure 12 is a transverse horizontal section taken on line 12—12 of Figure 11, showing the automatic valve control for the return passage, the automatic flow diverting check valve connecting the opposite fluid pressure conduits from the opposite ends of the fluid pressure cylinder with the common return passage to the fluid reservoir, the cam controlled plunger valve interposed in said passage between said check valve and reservoir, and the thermostatic valve in a bleeding bypass communicating with said return passage and reservoir.

Figure 13 is a front elevation of the outer face of the shock absorber showing the automatic weight control for the valve of the return passage and its return checking dash pot.

Figure 14:
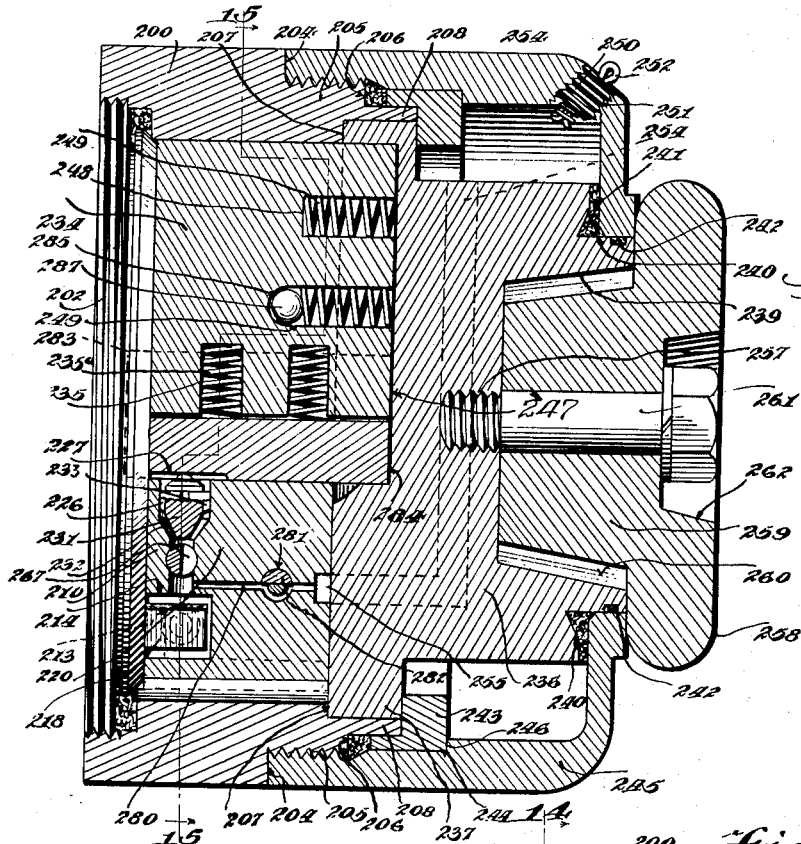
Figure 15:
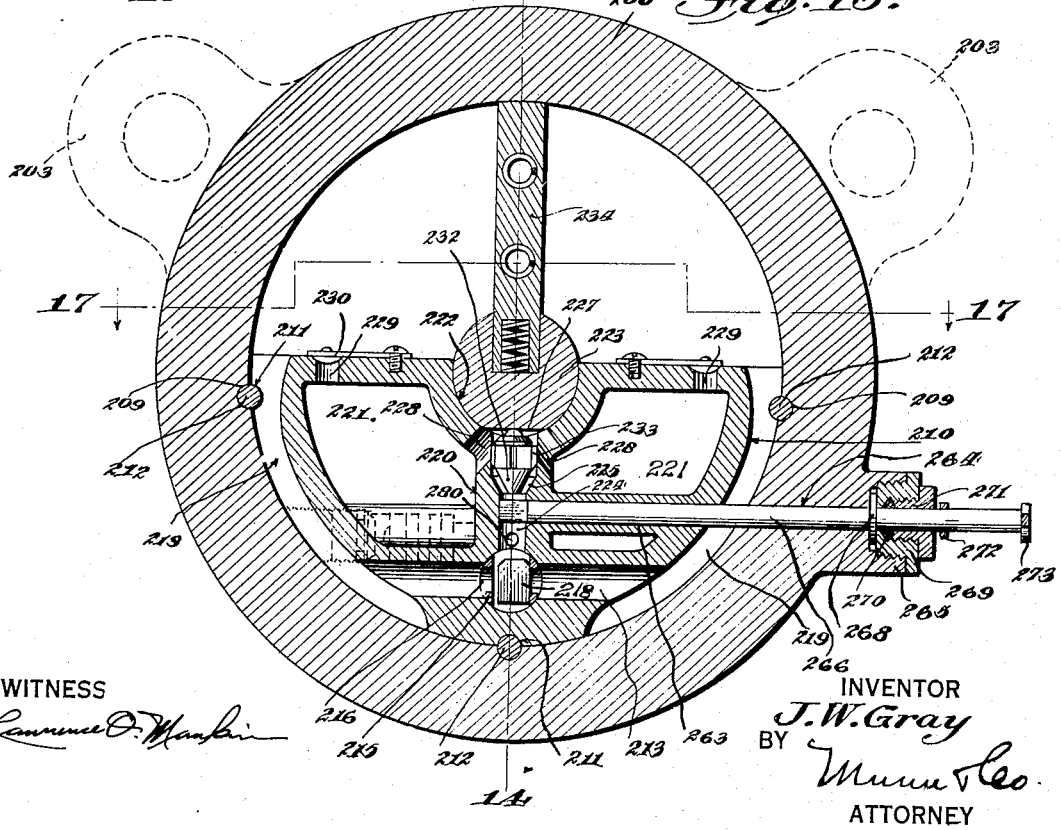

Figure 14 is a vertical transverse section through a cylindrical or disk oscillating piston type shock absorber embodying the same features of fluid control shown in the rectilinear reciprocating type of Figures 1–13 including similar automatic adjustments for the control valve of the fluid return passages, the section being taken on line 14—14 of Figure 15.

Figure 15 is a longitudinal vertical section taken on line 15—15 of Figure 14.

Figure 16:
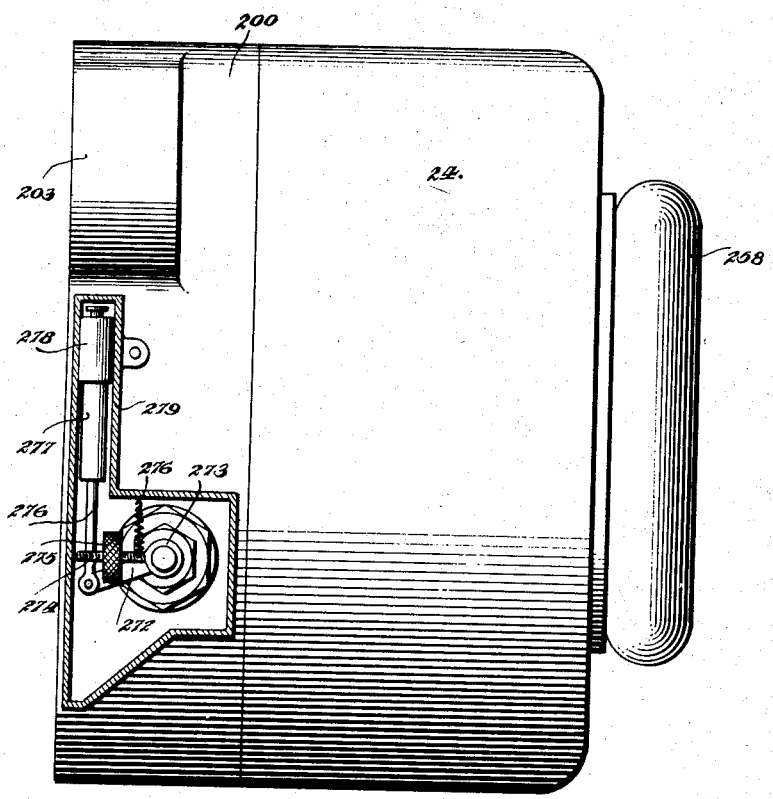

Figure 16 is a view in end elevation of the shock absorber of Figures 14—15, showing the automatic valve adjustment control.

Figure 17:
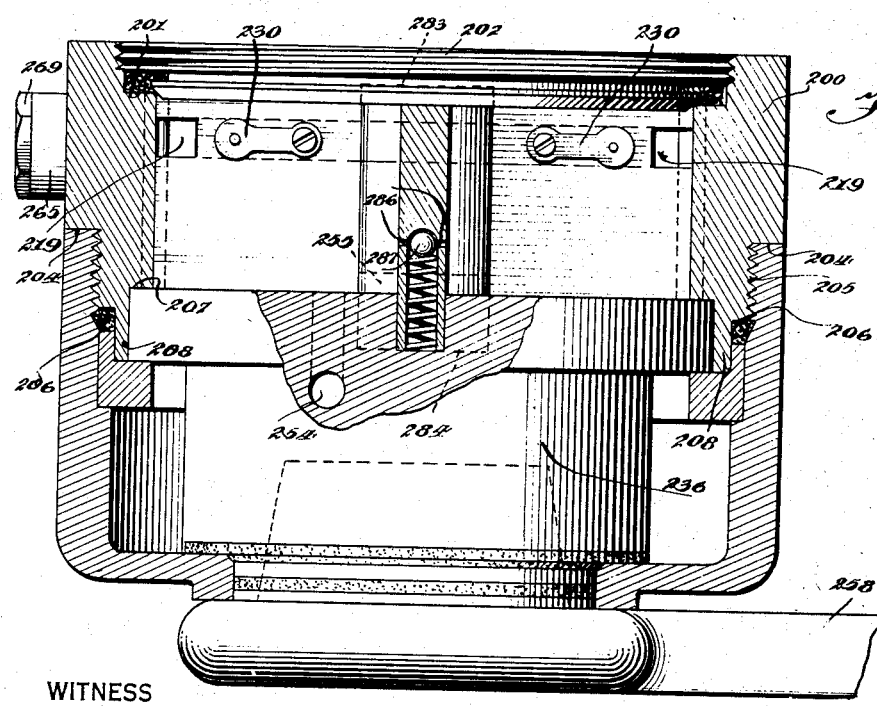

Figure 17 is a horizontal transverse section through the shock absorber taken on line 17—17 of Figure 15.

Figure 18 is a detail in top plan of the piston actuating arm detached, with the connecting portion of the spring saddle yoke shown in section.

Figure 19 is a view in rear elevation of the spring saddle yoke and its actuating arm connection as shown in Figure 18, with the connection of the saddle yoke and its connecting link in section.

Figure 20 is a vertical section on line 20—20 of Figure 19.

Figure 21 is a detail of the lower plate of a saddle yoke.

Figure 22 is an enlarged sectional view of a novel packing closure employed in various portions of the device.

Figures 23, 24, 25:
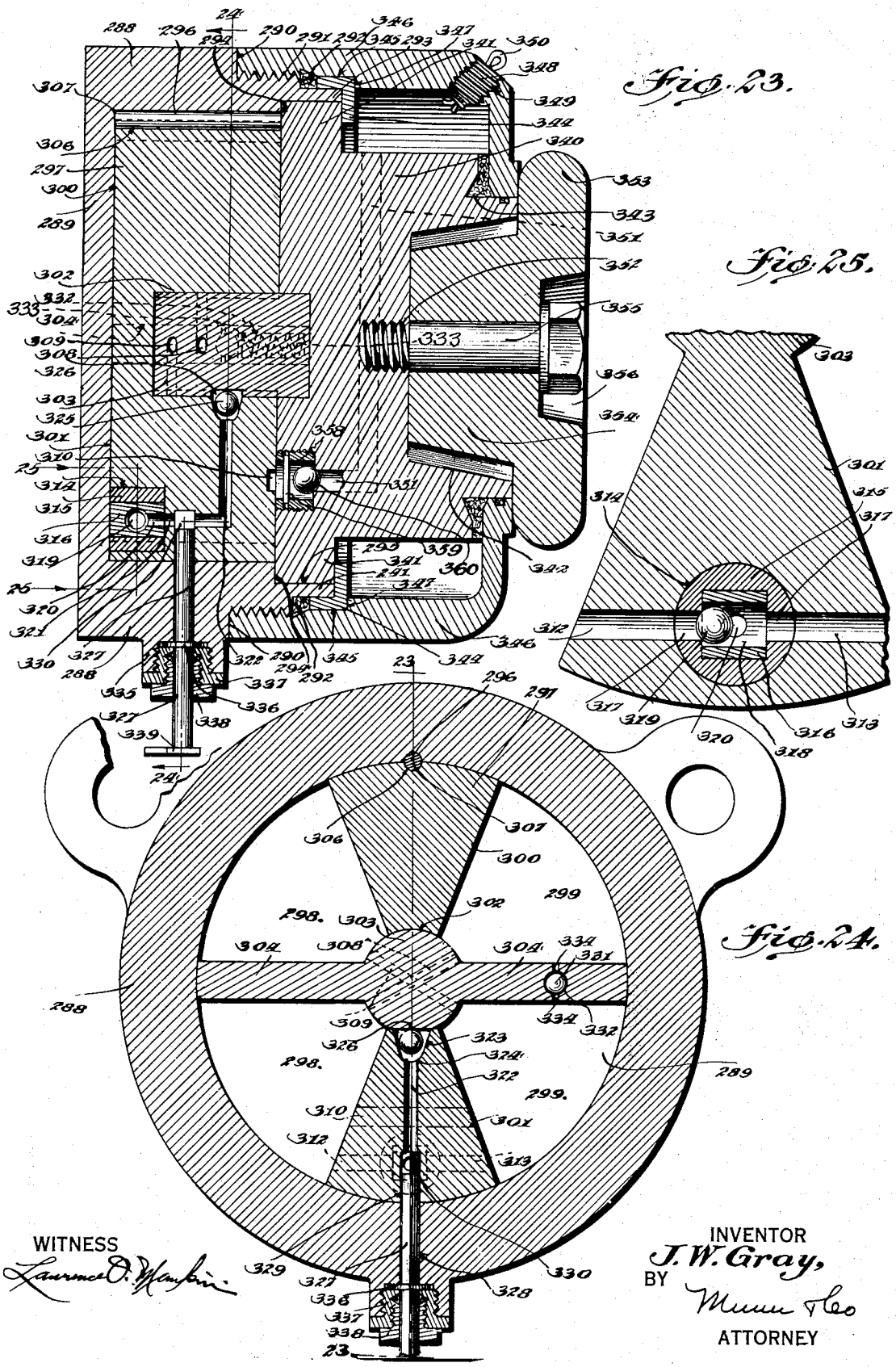

Figure 23 is a longitudinal vertical section through a double wing oscillating piston shock absorber of the general type shown in Figures 14–17, the section being taken on the line 23—of Figure 24.

Figure 24 is a transverse vertical section taken on the line 24—24 of Figure 23.

Figure 25 is a sectional detail on an enlarged scale taken on the line 25—25 of Figure 23.

Figure 26 is a transverse vertical section taken on line 26—26 of Figure 6.

The damping devices of the present application, while designed primarily for use as absorbers or spring damping devices for supported vehicle bodies, particularly motor vehicles, and while illustrated and described as applied to this use, are applicable in principle and can be used with various relatively movable parts where need of damping relative movements where need of damping relative movement or shock.

In the use of spring damping devices on motor vehicles, it is preferable to mount such damping devices at all spring suspension for uniform results as is frequently done, they may be applied in part, as at the front or rear end.

In the drawings, I have illustrated application of a single damping unit, only and preferably are applied to all points of spring suspension. In Figure 1, I have illustrated the application of a single damping unit to the left front side of the conventional motor vehicle having conventional spring suspension, the particular equipment shown in this figure of the drawings and in Figures 2-5, being intended for use with a set of four damping units similarly applied to the four points of spring suspension and having a common remote control adjustment and pressure, conveniently disposed adjacent the driver's seat with a controlling actuator mounted on the instrument board for convenient access. This common remote control will, however, be discussed in detail as the invention is more fully developed descriptively.

The damping cylinder shown in Figures 1, 6-9, inclusive, and 11-13 inclusive, is of the tubular cylinder, rectilinearly reciprocating double acting piston type and the form shown in Figures 14-17 inclusive is of the disk or cupped cylinder type with double acting oscillatory reciprocable piston, both forms employing common operative principles and the terms cylinder and reciprocating piston being equally applicable to both forms.

In the first form of the device shown in Figure 1, and in Figures 6-13, a tubular body 1 is provided with a cylinder bore longitudinally of its lower portion forming a piston chamber 2 surmounting a transverse head 3 (Figures 6-7) having a transverse bore 4 therein journaling a piston actuating rotor 5 therein and providing also under face of the rotor being cut back as at 6, a free space constituting a fluid reservoir, the (Figures 6 and 7) to provide this reservoir space. The rear face of the cylinder block or body 1 is flat to contact uniformly with the outer side face of the frame channel F (Figure 1) of the motor vehicle frame and the surmounting head 3 at opposite sides is formed with ears 7 having bores therethrough for the insertion of securing bolts (Figure 1) which extend through and are clamped to the frame channel F.

The cylinder body 1 below the piston chamber 3 is provided with a depending control base substantially alined with the surmounting 3, shown in transverse vertical section in Figures 7 and 11, and in horizontal section in Figures 8 and 12, this base having formed therein series of fluid passages or bores in which are closed flow controlling valves, and having a series of counter bores housing control valves valve actuating means, all of which will be described in their order.

Base 10 at the rear or frame channel face body 1 is formed with an elongated trunk 11 (Figures 8 and 12) having an inter-enlargement 12 with a boss 13 at its this trunk being traversed by horizontal bores 14 extending from its opposite ends ally of the cylinder to merge in a traversal bore 15 of greater diameter formed enlargement 12 of the trunk 11. A sleeve 16 (Figures 7, 8, 11 and 12) having snugly to fit the bore 15 and ports 17 the adjacent ends of the bores 14, fitted in the bore 15 and centrally and as shown in Figures 8 and 12. centrally slotted portion of the length co-extensive with its slots is somewhat less than the width flat faced rectangular block or utting a check or slap valve and ely to contact the opposite sides of the slotted portion of sleeve 16 responsive to fluid pressure thereagainst to close the ports 17 in alternation and divert fluid forced through the bores 14 by piston pressure, as hereinafter shown, alternately into a single common return passage leading back to communicate with the reservoir space 4. The vertical edges of this valve plate at the inner side of the trunk are beveled as at 18a, Figures 8 and 12, beyond the area of ports 17 to provide adequate passage area for the fluid.

The bores 14 constitute pressure fluid discharge passages and communicate with the cylinder or piston chamber 2 at its ends and at opposite sides of the piston therein through passages 19 connecting the ends of the chamber 2 with the outer ends of the bores 14 as shown in dotted lines in Figs. 7 and 11. The pressure fluid discharged from the discharge passages 19, 14, impinging through the opposite ends of the cylinder 2 on the plate check valve 18 is diverted into the interior of the sleeve 16, passes over the beveled edge 18a of the plate check valve 18 and into a single common return passage 20 adjacent the lower end of the central vertical bore 15 of trunk 11, this return passage 20 traversing the base 10 at right angles to the alined discharge passages 14-14. Below the junction of this return passage with the vertical bore 15, the later extends downwardly through the boss 13 and is internally threaded to form a shoulder 21 and is enlarged in diameter to form a shoulder 21 and is internally threaded. A leak proof closure of novel form, shown in enlarged detail in Figure 22, and of general utility, closes the lower end of this bore. This closure comprises a plug 22 having wrench sockets (Figure 22) or similar turning means in its outer face, and threaded to engage the threaded interior of the lower end of bore 15. This plug has a shank 23 of reduced diameter adjacent its inner end provided with a head 24 of increased diameter with an inwardly tapering or beveled side face permitting the inner end of the plug head to extend into the bore 15 above its shoulder 21 with the beveled side of the plug head engaging with line contact the edge of the shoulder 21 forming a metal to metal sealing contact. The maximum diameter of the plug head is less than the enlarged diameter of the bore 15 below shoulder 21 and compressible packing 25 is filled around the plug head and shoulder 21. When the plug is screwed up tight to bring the beveled side of its head 24 tightly against shoulder 21 forming a metal to metal seal, the packing 25 is forced against the shoulder and into the threads of the bore 15 therebelow. Where, as in fluid pressure chamber and passages closure and as in the present case, the closures are subjected to great fluid pressure from the interior, any leakage past the metal to metal seal of the head 24 and shoulder 21 only forces the packing 25 more tightly in the threads of the bore, positively preventing leakage past the threads of the plug 22. The greater the internal pressure, therefore, the greater the sealing pressure of the closure plug. The parts of the closure plug in the enlarged detail view of Figure 22 are identified by the same reference numerals as used above.

At the opposite side of the base 10 from the bore 15, a second and transversely alined vertical bore 26 extends upwardly from a boss 27 at the bottom of base 10 to communicate at its upper end with the transverse bore 4 of the head through a clearance space 28 beneath the rotor 5 as shown in Figures 7 and 11. The transverse bore 20 extending from vertical bore 15 communicates with bore 26, these two bores constituting the return passage to the fluid reservoir 4 from the two sets of discharge passages 19—14. The lower end of the bore 26 below the junction therewith of bore 20, is enlarged in diameter to provide a shoulder 29 and is internally threaded therebelow to receive a closure plug 30 constructed and operating identically as the plug 22.

As will be seen from Figures 8 and 12, the return passage bore 20 extends substantially tangentially to the bore 26. This bore 20 extends through the base 10 to the side of the base opposite to its frame channel engaging face and axially through an internally threaded boss 31 of substantially greater internal diameter than the diameter of the bore 20, the internal diameter inwardly of the boss being reduced to form a bushing shoulder 31a and inwardly thereof the base 10 having a bore 33 therethrough alined with the bore 20 and of coincident diameter providing a second shoulder or abutment face 32 inwardly of and of less diameter than the shoulder 31a. A rotatable sleeve valve 34 extends from the exterior of the base 10 through the bore 33 and partially within the bore 20 and from its inner end outwardly to a point alining with bore 26 is formed with an internal bore or fluid passage 34a which terminates in line with the vertical bore 26 of the return passage and is laterally outturned to form a valve port 35 (Figures 8 and 9). With this sleeve valve turned to the position shown in Figure 9 in full registry with the bore 26, a full volume of flow upwardly into the return bore 26 is permissible; with the sleeve valve partially turned to restrict the extent of its opening communicating with bore 26, variably restricted flow volumes are permitted. Intermediate of its ends, the sleeve valve 34 is provided with a fixed collar 36 intended to abut its face against the inner shoulder or abutment face 32 (see Figure 7). A bushing 37 internally and externally threaded and having an end flange 38 extends into the threaded interior of the boss 31 and engages its inner end with the shoulder 31a and with the collar 36 forcing the latter tightly against its abutment surface 32. A packing gland 39 is externally threaded to engage the internally threaded bore of the bushing 37 and has a cupped inner end tapered radially outward, suitable compressible packing being inserted between this cupped inner end and the end of the bushing 37 to render the closure leak proof, the metal seal afforded by the collar 36 and the abutment face 32 in conjunction with the compressible packing affords a double sealing protection, since any fluid which may leak past the collar will act to force the packing more tightly against the threads of the bushing 37 and gland 39. The sleeve valve 34 in the form of the invention shown in Figures 7 and 8 extends substantially beyond the end of the bushing 39 and through the outer face of a metal housing 40 overlying and spaced outwardly from the packing gland 39 and from the side of the base 10 to which it is appropriately secured as shown in Figures 7 and 8, this housing inclosing the inner end of a fluid cylinder 41 housing a piston plunger 42 (Figures 7 and 8), the cylinder having appropriate flanges by means of which it may be secured to the base 10 as shown in Figure 8. The end of the piston plunger projects beyond the inner end of the cylinder and is cut down as shown at 43 to extend beneath the sleeve valve 34. The upper face of this cut down end extension 43 is slotted and a crank pin 44 affixed to and depending from the sleeve valve 34 and pivots in the end of the slot and by movement of the piston plunger 43 is effective to rotate the sleeve valve. A coil spring 45 within the piston chamber of the cylinder block 41 normally tends to move the piston inwardly of the cylinder and to position the port 35 of the sleeve valve for full volume opening into the upwardly extending bore 26 of the return passage. The outer end of the cylinder block is enlarged in internal diameter and threaded for the connection thereto of the end of a fluid conduit pipe 46 (Fig. 1) through an appropriate packing gland or bushing. This conduit extends to a fluid pressure cylinder 117 shown in Figure 1 and in detail in Figure 2 and will be described more fully in connection with the remote control of the volume flow regulating sleeve valve (34) of the device.

The adjustment of the sleeve valve will predetermine the volume of flow permissible from the bore 20 of the fluid return conduit to the complemental bore section 26 leading back to the fluid reservoir. Restriction of the flow through this passage to the return reservoir, and therefore spring damping action, is provided by means of a novel form of controlling valve interposed in this portion of the return passage between the volume controlling sleeve valve and the junction of the passage bore 26 with the reservoir space afforded by bore 4.

As will be seen particularly from Figures 7, 9, and 11, the closure plug 30 is provided with a cylindrical extension 48 inwardly of its sealing head, this extension having a conically tapered end 49 similar to the end of a needle valve and being fixed in position in the bore 26 by the application of the closure plug. Slidably mounted in the bore 26 is a tubular plunger valve 50 having an external diameter coincident with that of the bore 26, a central fluid passage bore 51 and a head 52 of reduced diameter below which the bore 51 terminates and is provided with a series of lateral radial extensions 53 shown in Figure 10 through which the fluid may exit and pass outwardly between the sides of the head 52 through the passage 28 in the reservoir. The upper end of the head is provided with a central axial socket in which is seated and retained a bearing ball 54. The lower end of the tubular plunger valve has its inner face outwardly tapering as at 55 providing a tapered enlargement of the fluid passage 51 at its lower end, which tapered enlargement cooperates with the conically pointed end 49 of the fixed stem 48 progressively to increase or decrease the area at the lower end of the plunger valve through which the fluid may flow and thereby providing for progressive increase or decrease of the resistance offered to flow of fluid through its passage 51 to the reservoir. The rotor member 5 directly above the plunger valve 50 is formed with a flat face 56, best seen in Figure 9, providing the passage 28 and functioning as a cam and effective in the oscillation of the rotor member in reverse directions to move the plunger sleeve valve 50 downwardly toward the fixed passage restricting member 58 against the upward flow of fluid under pressure therethrough. The skin friction of this fluid flow at all times serves to maintain the contacting anti-friction ball 54 against the cam surface 56 providing by the effect of this skin friction, movement of the plunger sleeve valve 50 upwardly to increase the passage area and to decrease the damping action as permitted by the position of the cam face 56 and also by the same skin friction holding the upper end of the plunger sleeve valve against the cam face for actuation of the plunger sleeve valve downwardly by the cam progressively to restrict the fluid passage area and progressively to increase the damping action thereby.

The rotor member, which has been generically designated by the numeral 5, is best seen in Figures 6, 7 and 11 and is in the form of a short plug of substantially circular cross section under cut at 6 as previously described to provide for a fluid reservoir as at 4 and adjacent its outer end is formed with an annular external flange 57 bearing against an annular shoulder 58 provided by an enlargement at the outer end of the bore 4, this flange seating within an external boss 59 formed at the outer side of the head 3. A washer plate 60 engages the outer edge of the annular flange 57 and maintains the rotor in position within the bore 4 by means of an internally threaded flange 61 engaging the threaded boss 59. A packing gland 62 is inserted in the periphery of the flange 57.

In the mounting of shock absorbers or spring dampeners upon the modern motor vehicle cognizance must be taken of the limited space available between the channel frame of the chassis and the wheels and other adjacent parts of the vehicle within which the shock absorber body may be mounted. I have provided a construction of operating rotor and actuator therefor which avoids any appreciable projection of the parts beyond the cylinder body of the absorber and at the same time provides for a convenient and rigid adjustable connection between an actuating crank arm and the rotor member. Accordingly the rotor 5 in its outer face is formed with an inwardly tapering recess 63 with the sides of the rotor within the recess formed as a circular series of ribs or splines 64 extending inwardly from the outer edge of the rotor. An actuating crank arm 65 Figures 1, 6, 7 and 18 is formed at one end with an inwardly facing tapered head 66 having interfitting splines 67 thereon and an axial bore 68. In line with this bore, the rotor 5 is provided with a threaded socket 69 receiving the threaded end of a retaining bolt 70 inserted through the bore 68 and into the socket 69, its head 71 having preferably an underlying lock washer and seating within a circular recess 72 formed in the face of the crank arm 65 so as not to project outwardly therefrom.

The head 3 of the cylinder body 1 at a point above the center of the piston chamber 2 is formed with an upwardly extending boss 73 internally threaded to receive a screw plug 74 by means of which fluid may be introduced into the cylinder body, this plug being provided with a bore therethrough in which is seated the shank of a spring pressed check valve 75 of suitable construction best seen in Figure 7 and functioning as a pulsating valve for the intake and egress of air in the operation of the piston and rotor.

In line with the filling block, the rotor is provided with a vertical bore 76 therethrough in which is seated the upper end of an actuating crank pin 77 closely fitting in said bore as shown in Figure 7. The inner end of the rotor 5 is tapped by an axial threaded bore 78 and the adjacent peripheral face of the crank pin 77 is slotted in alinement therewith at 79. A screw plug 80 threading into the bore 78 has a pin 81 extending inwardly from its inner end into the slot 79 to retain the pin in the rotor member.

The end of the transverse bore 4 in the surmounting head 3 of the cylinder body 1 is enlarged in diameter to provide an internal shoulder 82 and internally threaded portion of increased diameter outwardly therethrough. This end of the bore is closed by a screw plug 83 corresponding and functioning similarly to the screw plugs 22 and 30 previously described and shown in enlarged detail in Figure 2.

The crank pin 77 depends from the rotor 5 and is seated in the piston of the shock absorbing or damping cylinder, the construction of which will now be described and which may be best seen from Figures 6 and 7 of the drawings. The piston 84 is of generally cylindrical form and of the double type, its opposite ends 85 constituting separate piston heads and having peripheral grooves therein seating suitable sealing rings or packing providing leak proof engagement with the walls of the cylinder or piston chamber 2. The outer ends of this cylinder are enlarged in diameter to provide annular abutment shoulders 86 and are internally threaded outwardly of said shoulders to receive threaded sealing plugs 87 structurally identical with the sealing plugs 22 and 30 heretofore described so that further detailed description of the plugs 87 is unnecessary.

In line with the vertical bore 76 of the rotor and of the crank pin 77 seating therein when positioned vertically by the rotor, the piston is formed centrally with a transverse bore 88 therethrough. The top of the piston midway of its length is reduced in diameter at 89 and its bottom face is slotted at 891 (Figs. 7 and 8) substantially in its vertical center to provide a fluid passage beneath the piston head at this point. The piston is also slotted downwardly from its top at opposite sides of its middle point with the end walls 90 of the slot converging to intersect the bore 88 substantially at its horizontal center leaving a half round bearing surface to the bore at the base of the slot, the width of which slot coincides substantially with the diameter of the crank pin 77. Between the inner edges of the piston heads 85 and the outer edges of the intermediate reduced portion 89, the piston body 84 is cut down to a substantially reduced diameter providing annular peripheral passages 91, communicating with the central bottom passage 891 and with the fluid reservoir 4 above the piston and at the lower side of the rotor chamber.

The piston heads 85, in line with the passages 91 are provided with vertical bores 92 extending from their bottom upwardly to adjacent their tops where the vertical passage bores below its upper end communicate laterally of the piston heads with horizontal bores 93 which extend to the outer faces of the piston heads at their sides and place the fluid passages 981, and 91 in communication with the fluid reservoir space 4. The peripheral space between the piston heads 85 is, it will be noted from the showing in Figure 7, in registering communication with the fluid reservoir space 4 in all positions of the piston.

The piston heads 85 at the upper ends of the vertical bores 92 are formed with longitudinally extending bores 94, the outer ends of which are threaded and receive flanged bushings 95. The inner ends of the bores of these bushings are outwardly tapered to form valve seats which are engaged by the correspondingly tapered noses of spring pressed check valves 96 constituting safety or blow-off valves in the event the damping pressure through clogging or other causes in the pressure passages becomes excessive to the danger point, whereupon these check valves 96 will yield to permit the pressure fluid to force back into the reservoir communicating passages above described. Below the bores 94 and at the lower end of the vertical passages 92 the piston heads 85 have a second longitudinal bore 97 communicating with the bores 92 and having their outer ends closed by appropriate check or flap valves 98 normally tensioned to seat in and close the passage bores 97 at the outer ends of the piston heads but opening outwardly under the suction created by reverse reciprocating movements of the piston to fill the piston chamber rearwardly of the piston as it moves in the suction creating direction.

The lower end of the crank pin 77 is rounded to bear upon the lower face of the transverse bore 88 to the piston and has a sliding fit in a vertical bore 99 formed centrally in a wrist pin 100 rotatably fitting in the bore 88 and having rounded ends 101 (Figure 7) conforming to the contour of the sides of the piston chamber or cylinder 2. This wrist pin 100 is retained in the piston between the upper end lower walls thereof best seen in Figure 7 bearing upon the walls of the bore 88, forming the upper and lower faces of these retaining portions of the piston body, as the piston is reciprocated through the crank pin 77. The latter when the rotor member 5 is oscillated will slide up and down in the wrist pin 100. The pressure fluid, preferably heavy oil, which is used will provide a lubricating film, coating the bearing surfaces of the wrist pin 100 and of the crank pin so that these parts receive minimum wear.

To provide for a reduction of the volume flow of the pressure fluid, in cold weather when the pressure fluid becomes extremely viscous through lower temperatures, I have provided a vertical bleed passage 102 extending from a point of junction with the horizontal section 20 of the return fluid passage between the pressure fluid diverting check valve 18 and the vertical bore portion 26 of the return passage, upwardly through the base 10 of the cylinder body to communicate with the bottom of the piston chamber of the cylinder 2 in line with the passage 89l formed by the slotted base of the intermediate portion of the cylinder and in line with the annular passage 91 adjacent thereto so that fluid bleeding upwardly through this passage 102 will return to the reservoir.

Between its upper and lower ends, this bleed passage is traversed at right angles by a bore 103 extending longitudinally of the cylinder body, this bore, as shown in Figure 6, being substantially enlarged in diameter at one end at 104 to provide a thermostatic cylinder or piston chamber which is increased in diameter at its outer end to provide a sealing shoulder 105 and is closed by a sealing plug 106 similar in construction and operation to the sealing plug 22, 30, 87, etc. heretofore described. The opposite end of the bore 103 at the opposite side of the cylinder base 10 is similarly enlarged and threaded to receive a similar closure plug 107, the inner end of which as seen in Figures 6 and 8 is provided with a rigid and preferably integral half round stem 108 projecting inwardly therefrom. A plunger 109 inserted through the bore 104 is cut down at its inner end to form a cooperating half round end portion 110, the flat face of which engages the flat face of the half round stem extension 108 and is retained thereby against rotation. This half round end of the plunger is of substantially greater diameter than that of the cooperating stem 108 and functions as a valve port when alined with the vertical bleed passage 102. A coiled spring 111 interposed between the inner end of the sealing plug 107 and the end of the plunger 109 normally tends to move the plunger 109 to the right as viewed in Figure 6, this tendency of the spring being controlled by a thermostatic fluid, preferably mercury because of its high co-efficient of expansion, acting against the opposite end of the plunger. To this end that portion of the plunger 109 seating in the bore 104 is enlarged in diameter to form a piston 112 having sealing rings adjustable to provide an extremely tight seal with the walls of the bore and shown in detail and to be described later in connection with the piston of the fluid pressure control chamber shown in Figure 2 and used in connection with the manual remote control for the flow volume regulating valves 34. The piston 112 is spaced from the inner end of the sealing plug 106 and this space is filled with the thermostatic control fluid such as the mercury hereinbefore mentioned. In warm or hot weather, the expansion of this thermostatic fluid is effective to move the plunger 109 against the tension of the spring 111 to position the valve port formed by its half round end 110 beyond the bleed passage 102 and in the position shown in Figure 6. Therefore, during the prevalence of warm weather, the bleed passage is closed. The volume of the controlling mercury fluid, however, will decrease in cold weather and permit the coiled spring 111 to force the valve port at the end of the plunger 109 to the right and across the vertical bleed passage 102 as suggested by the showing in Figure 7 so that the pressure fluid being forced through the bore 20 of the return passage may bleed upwardly through the bore 102 past the half round end of the plunger. It will be noted that the guiding stem 108 engaging and maintaining the plunger for movement in a straight line is of substantially less diameter than the plunger 109 thereby providing a passage (seen in Figure 7) through which a portion of the fluid forced through the return passage may flow upwardly and be diverted back to the fluid reservoir through the slot or groove passage 89l, the annular passages 91, vertical bores 92 and lateral bores 93 communicating with the fluid reservoir.

The outer end of the sleeve valve 34 which projects beyond the housing 40 is provided with an indicator arm 113 which may be used for manual adjustment in the event of remote control not being employed and which may be used in conjunction with such a remote control as a checking indicator. This remote control, so called, is intended for use as a common manual adjustment for a series of damping or shock absorbing units of the type described mounted upon the motor vehicle, the control itself being conveniently positioned adjacent the driver for manipulation.

Referring particularly to Figures 1–5 in conjunction with the cylinder 41 shown in Figures 6 and 8, it will be seen that the outer end of this cylinder 41 receives one end of a tubular fluid conduit 46 shown in Figure 1, similar conduits extending to the ends of the cylinders 41 of each shock absorbing cylinder mounted on the vehicle and communicating through suitable branch conduits and T connections with a common fluid supply conduit 114 leading upwardly and to and communicating with a discharge pipe 115 (Figure 2) in the head 116 of a fluid pressure cylinder 117. This pressure cylinder is provided at its upper end with a filling plug 118 and on its under side with a tapped boss 119 to which is bolted a bracket 120 which may be in turn secured to and supported from the dash D (Figure 1) of the motor vehicle. A pressure piston 121 having a sealing head of unique construction, later to be discussed in detail, has its piston rod 122 enlarged and formed as a worm 123 threading through the boss 124 formed on the cylinder head 125 which has an internally threaded flange 126 threading on the externally threaded end of the cylinder 117. The worm section 123 is of sufficient length to provide for full movement of the piston 121 in its cylinder. From the outer end of the worm section 123, an extension 127 of the piston rod is provided, having a length sufficient to reach to the instrument board I of the vehicle passing through an appropriate opening 128 formed in the bracket plate 120 attached to the lower edge of the instrument board. This bracket plate upon its outer face is formed as a disk 129 (Figure 3) having an annular series of teeth 130 extending around its outer edge. The extremity of the extension 127 turns freely through the bracket 128 and is reduced in size and squared as shown at 131 (Figure 2.) This squared end extends through a similarly squared opening formed centrally in the rear face of a knurled adjusting head 132 and into and through an annular enlargement 133 of said opening. The terminus of the squared shank 131 is shouldered down and threaded to receive an end nut 134 which extends within the chamber 131 and is abutted by a coiled spring 135 housed in said chamber and normally acting against the rear face of the head 132 yieldingly to hold it against the toothed disk 129. The inner face of the head 132 is provided at its edge with a series of notches 136 shaped and spaced to cooperate with the annular series of teeth 130. Since the extension 29 is carried to the abutting head 132 through its squared end portion 131, turning movement of the head 132 will be effective to rotate the extension shank 21, the worm 132 and through the worm to advance or retract the piston 121. To effect an adjustment, the knurled head 132 is pulled outwardly to clear its notches 136 from the teeth 130 and is turned to the desired extent. An indicator plate 137 may be imbedded in a channel in the outside face of the knurled head and may be suitably calibrated to cooperate, for example, with the center top tooth 130 to indicate the adjustment made.

In the drawings, in Figure 1, I have merely shown the connection of the pressure cylinder 117 with a single front shock absorbing or damping unit, the conduit connections to other units being merely suggested by a connection T and branch pipe generically shown. It is not believed to be necessary to show these other connections, since their nature will be obvious and constitute merely a duplication of the connections to the damping cylinder shown in Figure 1.

It will be understood that the cylinder 117 with the piston 121 fully retracted through its worm, is initially filled with fluid such as heavy oil and also the conduits leading to the cylinders 41 of the shock absorbers connected to the pressure cylinder 117. Movement of the piston 121 from a fully retracted position toward the left as viewed in Figure 2 will, obviously, force the fluid under pressure through the conduit 114 and by branch pipes such as 46 (Figure 1) to the cylinders 41. This fluid as will be seen by reference to Figures 8 and 7 respectively will operate against the pistons 42 to move them in the direction of the sleeve valves 34 turning these valves from the fully opened position shown in Figure 8 to restrict the area of the port 35 communicating with the bore 26 of the return passage and thereby vary the volume of flow permissible through said return passage. Reverse movement of the piston 121 through the controlling knob 132 and its described worm gear connection will reduce the fluid pressure and permit the coiled springs 45 attached to the pistons 42 reversely to turn the sleeve valves 34 as permitted by the reduction of fluid pressure and the adjustment of the head.

In connection with the piston 121 as shown in Figure 2, I have disclosed a sealing piston head of unique construction and general application. Referring particularly to Figure 2, it will be seen that the outer end of the piston is reduced in diameter at 138 and provided at the inner end of the reduced area with an upwardly and rearwardly beveled shoulder 139 forming a wedging abutment. Seating over the reduced end 138 of the piston is an expansible packing or sealing ring 140 having reversely and inwardly beveled edges, one of which corresponds in bevel to and engages the abutment bevel 139. Abutting this packing ring 140 is a steel ring 141 having reversely and outwardly beveled edges so that inward longitudinal pressure of the steel ring 141 will cause the packing ring 140 to be wedged outwardly between the abutting edge of the steel ring 141 and the abutment bevel 139 of the piston periphery. As shown, two more packing rings 140 separated by a second steel wedge ring 141 are seated over the end of the piston, the outermost packing ring 140 being engaged at its outer inwardly beveled edge by the reversely beveled edge on the edge flange 142 of an adjusting head 143 having a central bore therethrough through which the threaded shank 144 of an adjusting screw bolt 145 extends into a threaded socket formed in the head of the piston. By tightening the head of the adjusting screw against the adjusting head 143, longitudinal inward pressure is applied through the steel wedge rings to the interposed packing rings, which pressure because of the reverse bevels, will act as a wedge against the packing rings forcing them outwardly into tight engagement with the walls of the cylinder 117. Adjustment is therefore provided not only initially to secure proper sealing against leakage, but to compensate for wear so that maximum use and wear of the piston rings is securable. Manifestly, the steel rings 141 are of the solid type so that adjustment of the head 143 only effects an expansion of the packing rings 140, for the steel rings 141, do not contact the cylinder and function as wedges only. Incidently, it should be noted that the pressure against the head 143 also and automatically functions to wedge the packing outwardly to seal in proportion to the pressure applied.

I have heretofore described the internal spline connection of the rotor actuating crank arm 65 with the socket 63 formed internally of the rotor 5. The connection of the outer end of the crank arm 65 to the vehicle spring or spring support will now be described. Referring particularly to Figures 1 and 18–21, it will be seen that the outer ends of the crank arm 65, is connected by a depending link 146 with a spring saddle or yoke 147. These connections involve constructions of saddle and wear compensating rattle proof joint connections of a novel nature. In Figure 18, the end of the crank arm 65 is shown as enlarged at 148 and thence inwardly tapered at 149. A U-shaped connector bracket 150 is provided at the base of the U portion with a similarly tapered bore 151 therethrough whose maximum diameter approximates the enlargement 148. The tapered end 149 of the crank arm is shouldered down and extended as a short threaded shank 152 and is engaged by a clamping nut 153 which presses a spring lock washer 154 against a shoulder 155 formed by an enlargement of the internal area of the bracket 150, the tension of the spring washer and the adjustment of the nut serving to draw the taper 149 of the crank arm end into the yoke bore 151, automatically maintaining the tapering surfaces in engagement and compensating for any wear which may occur through the tension of the lock washer. Where necessary over long periods of usage, compensation for wear may be effected by tightening up on the nut 153. The upper end of the depending link 146 is laterally enlarged and extends between the bifurcations formed at the outer end of the U shaped bracket 150. This enlargement is formed with a tapered bore 156 therein and a taper pin 157 having a head 158 of enlarged diameter, an intermediate tapered shank 159 and an end 160 of reduced diameter shouldered down and provided with a threaded end shank 161 is inserted through alined bores in the opposite sides of the bracket 150, these bores being sized to fit the head 158 and the reduced end 160 of the taper pin 157. A nut 162 engages the pin 157 and an interposed spring washer 163 serves to draw the tapered pin 157 into the tapered bore 156 of the depending link and to maintain the tapered surfaces in engagement as well as to compensate for wear as heretofore pointed out.

The lower end of the depending link 146 is similarly enlarged and a similar U-shaped bracket 164 embraces with its bifurcations the lower end of the link and connects therewith through a taper pin 165 and nut and spring washer in the same manner as above described. The base of this last named U-shaped bracket 164 similarly to the bracket 150 is traversed at right angles to the taper pin 165 by a second tapered bore 166 which is used to connect the end of the saddle or yoke.

This saddle yoke which, as shown in Figure 1 embraces the laminated spring S adjacent its anchoring axle A, comprises a flat base plate 167 having a circular bore 168 at one end and an elongated slot 169 adjacent its other end. The lower end of the shanks of eye bolts 170 extends downwardly through the bore 168 and slot 169 respectively and are engaged at the under side of the plate 167 by nuts 171 and lock washers. The upper or eye ends of these bolts 170 are seated upon the shank of a bolt 172 of unique construction which connects at one end with the U-shaped bracket 164 at the lower end of the link 146. This bolt 172 is formed at one end with a taper 173 which is inserted through the tapered bore 166 at the base of the U-shaped bracket 164, is reduced and shouldered at its outer end to provide a threaded shank 174 extending outwardly beyond the base of the U-shaped bracket and engaged by a nut 175 and spring washer to draw the taper 173 into the tapered bore 166 in the manner previously described with relation to the other tapered units. An annular flange 176 is formed on the bolt shank adjacent the washer 163 and acts as an abutment stop to engage the U-shaped bracket 164 and as a positioning stop for the eye of one of the eye bolts 170. At its opposite end the shank 172 of the bolt is threaded and extends through the eye of the second eye bolt as shown in Figure 20, its extremity being threaded to receive the clamping nut 177, a spring lock washer 178 being interposed between the nut 177 and the eye of the bolt. By reason of the elongation of the slot 169, the saddle provided by the plate 167, bolt 172 and eye bolts 170 may be adjusted to different lateral dimensions of laminated springs, of axles or other anchorages and by the adjustment of the nut 171 on the lower ends of the eye bolts to different vertical dimensions of such anchorages. The tapered joints described while of general utility, have the special advantage of equipment of this character of automatic compensation for normal wear and of quiet action, the slap and noise of the shock absorber arm joints in present day installations constituting a source of objection and complaint on the part of the user.

In the operation of the invention thus far described, with the unit mounted upon the frame of the vehicle and the end of the arms 65 connected to the spring or axle as shown in Fig. 1, when the vehicle wheels encounter shock producing road conditions, the double acting piston will be reciprocated back and forth from the intermediate position in Fig. 6 to force the fluid from the opposite ends of the cylinder into the passage 14 through the passages 19 (see Figs. 7, 8 and 26), the slap-valve 18 serving to prevent the flow of liquid from one portion of the passage 14 to the other. The fluid is thus diverted into the return passages 20 and 26, with the flow through the passage 20 controlled through the manually controlled valve 34 operated from the dashboard of the vehicle through the hydraulic connections shown. As the fluid passes the valve 34 into the passage 26 (see Figs. 7 and 9), the bullet-valve 50 and cooperating conical portion 49 of the extension 48 serves to further govern the volume of flow in synchronism with spring movement since the bullet-valve 50 is operated by the cam face 56 on the rotor member 5. At the same time, the thermostatically operated valve member 109 serves to compensate for temperature changes by controlling the by-pass 102 leading from passage 20 to the reservoir. It will be obvious from Fig. 6 that fluid from the reservoir will freely flow into the cylinders through passages 91, 93, 92, 97 and flap-valves 98 upon retraction of the piston after each operation thereof.

I have previously stated that the reduction in volume flow through thermostatic valve control may be used in conjunction with adjustment of the volume flow through the sleeve valve 34 by automatic control or that this latter automatic adjustment may be used to supplant the thermostatic control. Referring particularly to Figures 11, 12 and 13, it will be seen that the sleeve valve 34 projects a short distance only outwardly of the packing gland 39 and has fixed thereto an actuating lever arm 179 at adjacent to its U-shaped end which end embraces and overlies the projecting boss on the base 10 at this point. The extremity of this U-shaped end, as shown in Figures 12 and 13, anchors the upper end of a coiled spring 180 whose lower end is anchored to a fixed arm 181 anchored to and offset from the side of the base 10 longitudinally of the damping cylinder.

At a point on the base 10 above and offset vertically from the boss 39, a dash pot 182 is attached to the side of the base. As shown in Figure 13 the cylinder of the dash pot 182 is formed integrally with the base, although obviously it may be separate therefrom, and is formed with a lower bore 183 reduced in diameter at its lower end to form an annular stop shoulder, and houses a piston 184 having the upper end of a piston rod or link 185 pivotally connected thereto. The location of the dash pot positions the lower end of the piston link 185 so that it is pivoted at 186 to lever arm 179 at the side of the point of attachment sleeve valve 34 opposite to the spring 180 and substantially equidistant from the sleeve valve producing a balanced leverage.

The dash pot 182 includes also a liquid reservoir bore 187 above the piston cylinder and spaced therefrom by a ported partition 188 in which is mounted a spring pressed check valve 189 closing an intake port in the partition and opening in response to downward suction of the piston. A second port 190 of greatly restricted size provides a restricted passage for the slow return of the liquid from the piston cylinder back to the reservoir as the piston is moved upwardly therein through the tension of coiled spring 180. The top of the dash pot body above the liquid reservoir is closed and is provided with a filling plug 191 and a pulsating check valve loosely fitting an air intake opening and providing for intake and egress of air as the piston 184 is reciprocated.

The actuating lever arm is extended beyond the point of connection 186 of the piston link 185 thereto as a threaded shank 193 on which is adjustably mounted a weight disk 194 having a bore therethrough to screw on to the stem 193. A set screw 195 extending through the weight may be used to fix the weight on the lever arm when adjusted the desired distance longitudinally thereof coordinated to the strength of spring 180 and the flexibility of the vehicle springs. A sheet metal casing 196 encloses the dash pot, lever spring and the adjacent face of the base 10 as shown in Figures 12 and 13, to protect the parts from clogging by mud, road dirt, etc.

The fluid reservoir 187 is filled with a liquid congealable at freezing atmospheric temperatures, such for example as a saponified solution. With atmospheric temperature above freezing the dash pot piston is movable downwardly. When the dash pot liquid becomes frozen, this movement is prevented.

Downward movement of the piston 184 in the dash pot is opposed by the coiled spring 180 which normally, on a level smooth road holds the piston in its uppermost position seen in Figure 13 with the sleeve valve 34 controlling volume flow of the damping fluid of the absorber back to the reservoir, positioned with its port fully opened for the passage of fluid therethrough.

The weighted actuating lever arm 179 provides, with the dash pot liquid uncongealed, an automatic control for volume flow through the sleeve valve 34, proportioned and responsive to spring flexure by road shock and preventing the staccato recurrence of vibratory vehicle body movement due to the succession of road shocks received from a series of consecutive adjoining shock producing sections of road bed.

The first shock received will, through the weight 194 pull the dash pot piston 184 downwardly and turn the sleeve valve to restrict the volume of damping liquid flow in the shock absorber in the manner previously described. Liquid is thereby drawn into the chamber 183 from the reservoir 187 through the check valve 189 and coincidently the spring 180 is tensioned. The tensioned spring 180 now tends to return the piston 184 upwardly but the check valve 189 closes and the piston can only move slowly upwardly under the impulse of the spring since the liquid drawn in by the piston can only return slowly through the restricted opening 190 in the partition 188. The damping action caused by the restriction of flow volume through the sleeve valve 34 is therefore gradually lessened, and the vehicle body will be permitted to rebound only gradually from the initial down throw given by the first shock, thereby preventing the staccato vibration usually imparted by road shocks of this character and automatically regulating the action of the shock absorber to the character of the road surface encountered.

The regulation of the force of the applied damping action through control of the volume of pressure fluid passing through the return passage to the fluid reservoir is supplemented by the action on the fluid thus passed off the progressively operated plunger valve 50 interposed in the return passage between the controlling sleeve valve and the fluid reservoir 4. Therefore in freezing weather while with the thermostatic control valve and the bleed passage heretofore described omitted, the automatic weighted arm control with its dash pot heretofore described, is made inoperative for automatic regulation by reason of the freezing of the dash pot liquid which locks the piston 184 against movement by the weighted arm, this plunger valve member 50 is still effective automatically and progressively to increase or decrease the return fluid passage area and the damping force applied by restriction or enlargement thereof. The fully opened position of the sleeve valve port in freezing weather under these conditions, therefore compensates for the increased viscosity of the pressure fluid and full damping control of the pressure fluid may be had through the automatic damping control and regulation of the pressure fluid through the cam operated plunger valve 50.

In Figures 14–17, I have illustrated the operative principles of damping control, previously described in connection with a rectilinearly reciprocating piston type of damping shock absorber cylinder, applied to a damping cylinder or shock absorber of the "disk" type mounting an oscillating double acting piston, and including a disk type oscillating piston form of device of simplified form designed to reduce the cost of manufacture by minimizing the number of bearing surfaces requiring accurate machining operations for proper fitting.

Referring to these figures of the drawings, it will be seen that the cylinder body, proper, is formed as a cylindrical ring 200 having its bore at the rear edge increased in diameter to form an annular shoulder 201 (Figures 14 and 17) and internally threaded outwardly thereof to receive a threaded closure plug 202 having the structural characteristics and functions of the closure plugs 22, 30 etc., previously described in detail and therefore unnecessary to recapitulate here. The ring 200 adjacent to its opposite edge is reduced externally in diameter providing an annular external shoulder 204 and an externally threaded portion 205.

This threaded portion at its outer edge is further reduced in diameter externally to provide an annular packing shoulder 206 and, internally, is enlarged in diameter at its outer edge, providing an internal abutment shoulder 207, thereby forming the outer edge of the cylindrical ring 200 as a thin sleeve 208, the internal face of which forms a bearing for the bearing flange of a piston-mounting rotor later to be described. The inner peripheral face of the cylindrical sleeve within half of its circumferential area—as shown in Figure 15, the lower half—is formed with three tapering substantially semi-circular grooves 209 extending from the annular internal shoulder 207 rearwardly to the closure plug 202.

Seating in the lower half of the internal area of the sleeve 200 including the grooves 209 with its rear face abutting and having close contact with the inner face of closure plug 202, is a semi-cylindrical body 210 formed with a fluid reservoir, fluid passages and valved ports communicating with the other half of the sleeve area which constitutes a semi-cylindrical piston chamber. The outer peripheral faces of this body 210 in line with the grooves 209 in the sleeve 200 is correspondingly grooved at 211. Tapered pins 212 driven in the coinciding semi-cylindrical grooves 209, 211, serve to fix the body 210 in the lower half of the sleeve 200. The back of the semi-cylindrical body formed with a traversing bore providing a fluid passage 213 (Figures 14–15) which midway thereof in the vertical diameter of the semi-cylindrical body is traversed by a counter bore 214 of greater diameter in which is fixed a cup sleeve 215 (similar to the sleeve 16 of Figure 8) having opposed ports 216 therein alining with the bore 213, a length coincident with the length of bore 214 and a longitudinal axial slot 217 in which is seated flat plate 218 of substantially coincident length, but of less thickness than the width of the slot, its upper edges being bevelled as shown to provide adequate fluid passage area. This plate functions as a check or slap valve similarly to the plate 18 of Figures 7, 8, 11 and 12.

In line with the bore 213, the peripheral face of the body 210 is formed with a groove 219 (Figures 15, 17) of rectangular cross section extending downwardly from the upper horizontal edge of the body 210 to communicate with the ends of the bore 213 and terminate slightly beyond said bore adjacent to the lower end of the body as shown in Figure 15. This groove 219 forms with the bore 213, opposed fluid passages through which the oil or other damping fluid is forced in alternation by piston oscillation as later described to impact the plate check valve 218 which diverts the alternating flow of fluid through these opposed passages into a return passage leading to an oil or fluid reservoir within the body 210.

This body is hollow and is divided by a central web 220 lying substantially in the vertical center of the body, into two adjoining pressure fluid reservoir chambers 221 at opposite sides of the vertical median line of the web and of a semi-cylindrical depression 222 formed centrally and extending axially of the upper flat face of the body 210, this depression constituting a bearing for a cylindrical rotor shaft 223 seating in the bearing or depression to the extent of substantially half its peripheral area, and having its opposite ends bearing in a journaling socket 283 in the inner face of the closure plug 202 as shown in Figs. 14 and 17 and in an alining socket 284 formed centrally in the face of the hub member 236, hereinafter described.

Extending vertically upwardly through the web 220 from a point of junction with the bore 214 is a bore 224 constituting a return passage for the pressure fluid to the reservoir chambers 221. This bore at its upper end tapers outwardly at 225 forming a tapered valve seat and thereabove a valve chamber 226 of increased diameter. The upper end of the bore section 226 extends through the semi-cylindrical depression 222 to its exterior in alinement with a flat portion 227 formed on the under face of the rotor shaft 223 and constituting a cam. The upper end of the valve chamber section 226 of the bore 224 communicates through openings 228 with the interior of the fluid reservoir chambers 221. The horizontal top of the body 210 at opposite sides of the rotor shaft 223 constitutes the top wall of the two reservoirs 221 and is provided with fluid discharge bores 229 therethrough communicating with these two reservoir chambers, these bores being normally closed by flap or check valves 230 conventionally shown and providing for the withdrawal by suction of the piston of fluid from the reservoir chambers 221 upon opposite oscillatory reciprocations of the piston.

Mounted in the valve chamber 226 is a projectile shaped plunger valve 231 having a tapered base 232 cooperating with the tapered valve seat 225 progressively to restrict or enlarge the passage area for fluid. Above the tapered base 232 the side of the plunger valve has a plurality of wings 233 outstanding therefrom to engage and guide upon the walls of the valve chamber 226, the lower edges of these wings being beveled upwardly to permit the valve base to approach the tapered valve seat 225. These wings being spaced permit the flow of fluid upwardly therebetween through the valve chamber and thence through the passages 228 back to the reservoir 221.

The upper face of the rotor shaft 223 is longitudinally slotted from adjacent its inner end outwardly to its outer end to receive the lower end of a wing type piston block 234 of a width coincident with its slot having a curved upper edge to correspond with the curved wall of the cylindrical ring 200 within the upper portion thereof constituting the piston chamber. Preferably, this piston 234 is provided in its lower edge with a plurality of sockets 235 in which are mounted coiled springs 235a abutting the rotor shaft 223 at the base of its slot and normally tending to hold the curved upper end of the piston in firm contact with the walls of the cylindrical sleeve 220 constituting the piston chamber. The length of the shaft 223 is greater than the length of the bearing surface 222 so that a portion of shaft and wing piston projects forwardly beyond the outer edge of the bearing surface 222 of the semi-cylindrical body 210. The projecting end of the shaft seats in the bearing socket 284 and the projecting end of the piston plate is coupled to piston rotating elements arranged for actuation by movement of the vehicle body through flexure of its supporting springs as follows:

A hub member 236 best seen in Figures 14 and 17 is provided at its inner end with an annular flange 237 which abuts the annular shoulder 207 with its inner face and has its peripheral edge bearing upon the inner face of the sleeve 208. This hub member is formed with a socket 239 in its outer face edged by an annular series of splines or teeth, the socket having tapering sides and the teeth being correspondingly tapered. At its outer face, the hub member 236 is formed with an annular groove 240 outwardly of the recess 239 having packing receiving offsets 241 and 242 therein. The annular flange 237 terminates at its outer edge in line with the outer edge of the sleeve 208 and is held with its inner face against the annular shoulder 207 by means of a flanged ring 243 engaging thereover and over the outer edge of the sleeve 208. This ring has its outer peripheral face seated in an annular channel 244 formed upon the inner peripheral face of an outer cupped casing sleeve 245 at a point intermediate its inner and outer ends, the shoulder 246 at the outer edge of this annular channel overlying the outer face of the ring 243 and holding it firmly against the bearing flange of the rotor of the hub member 236. Preferably, packing is interposed between the inner end of the flange of the ring 243 and the shoulder 206, being held in the groove thus provided by the adjacent internal face of the cupped casing section 245 at its inner end, which face at that end is threaded over the threaded portion 205 of the cylindrical ring 200 and engages the shoulder 204 thereof. The cupped casing section 346 has its outer face formed with a central bore therethrough through which the outer shouldered end of the hub member 340 extends and against which it bears, the packing groove 242 being opposed to the side of the central bore, the inner face of the cupped casing section 245 at the edge of said bore overlying the annular groove 240 and serving tightly to compress the packing therein when the cupped casing section is screwed up tightly over the threaded outer end 205 of the cylindrical ring 200. The hub member 236 is formed with a radial groove 247 therein extending from the bearing socket 284 and of a width to receive the projecting end of the piston 234 so that the latter is coupled thereby to the hub member 236. Preferably, the end of the piston seating in the radial slot 247 is provided with sockets 248 housing coiled springs 249 which act against the hub member at the base of its radial slot and normally tend to hold the wing piston firmly against the rear face of the closure plug 202, making a fluid tight engagement of the edges of the piston 234 with the walls of the piston chamber. The rotor shaft 223 thus serves as the hub of the piston and turns in the semi-cylindrical depression or bearing 222 as the hub member 236 is rotated. The diameter of the outer casing section 245 is internally greater than the external diameter of the hub member 236 so that an annular space is formed which constitutes an outer fluid reservoir. A screw plug 250 closes a threaded filling bore 251 in the upper end of the casing section 245 and has a bore therethrough in which is seated a pulsating valve which as shown may be constituted by what in effect amounts to a cotter pin 252 having coiled springs overlying its outwardly bent feet, this arrangement permitting intake and egress of air into the outer fluid reservoir as the piston 234 is oscillated. Such an arrangement is necessary since the outer fluid reservoir space is subjected to pressure and suction of the damping fluid through an unrestricted passage 254, Figures 14 and 17, extending vertically downward through the hub member 236 at one side of its center and inturned as shown in Figure 14 to terminate at the inner face of the bearing flange 237 of the hub member in line with a groove or slot 255 traversing the outer face of the central web 220 and placing the opposite inner fluid reservoirs 221 in communication with the outer fluid reservoir within the casing section 245, without interruption, and without restriction by valving means or relative movement of parts.

At the base of the tapered socket 239 of the hub member 236 a threaded socket 257 is formed. An actuating arm 258 (Figure 17) corresponding to the actuating arm 265 of the form of the invention shown in Figures 1, 6, 7, etc., is provided at its inner end with a tapered head 259 having spline teeth 260 therein interfitting between the teeth or splines of the socket 239 of the hub member. This head 259 has an axial bore therethrough through which extends a securing bolt 261 whose inner threaded end engages in the threaded socket 56 of the hub member and holds the spline connection of the actuating arm thereto. The head of the bolt 261 preferably seats in a socket 262 formed in the outer face of the head 259.

It will be obvious that motion imparted to the actuating crank arm 258 will rotate the hub member 236 and oscillate the piston 234 from the central idle position shown in Figure 15 in opposite directions. Oscillation of the piston, say to the right in Figure 15, will force the fluid such as oil with which the piston chamber formed by the upper half of the cylinder 200, is filled, to the right and through the discharge passage 219 at that side of the cylinder downwardly through the bore 213 to force the check valve 218 against the opposite bore 213 of the sleeve 215 thereby causing the check valve to divert the damping fluid under the pressure of the piston upwardly over the beveled upper edge of the check valve and up through the vertical bore 224 to pass between the plunger valve 231 and its seat 225 and thence through the ports 228 into the reservoir chambers 221. The upper end of the plunger valve 226 seats an anti-friction ball or other abutment similar to the plunger valve 250 of the first form of the invention described, this ball or abutment engaging the cam portion of the rotor or hub shaft 223 constituted by the flattened face 227 thereof and as this hub shaft is rocked by the oscillation of the piston through the hub 236, the plunger valve 231 is moved downwardly to cause its tapered base 232 to approach the tapered valve seat 225 and progressively to restrict the passage of fluid therebeyond, this movement taking place against the direction of flow of the fluid which by skin friction maintains the contacting end of the plunger valve against the cam face of the rotor shaft. As in the first form of the invention described, this movement of the plunger valve is synchronized to flexure of the spring of the motor vehicle by shock as reflected by the movement of the actuating arm 258 and the resultant oscillation of the hub member 236 and the piston 234, the extent of restriction of the fluid passage by such movement of the plunger valve being proportioned both as to time and extent of amplitude of spring flexure. On rebound, reverse movement of the piston 234 occurs, the fluid drawn in through the check valve 230 into the space back of the piston 234 by the suction of the piston in its movement to the right in Figure 15 now being forced through the left hand discharge passage 219 to reverse the check valve 218 and divert the fluid under pressure upwardly through the bore 224 over the valve seat 225. On this reverse movement of the piston which reflects rebound of the flexed spring back to normal, the skin friction of the pressure fluid maintains the plunger valve in contact with the cam surface 227 which permits this skin friction to progressively move the plunger valve upwardly as permitted by the cam surface thereby progressively increasing the area of the fluid passage over the valve seat 225 and progressively decreasing the resistance to fluid flow or damping action as the vehicle springs progressively lose their stored energy on rebound. This would represent the action as the piston ring 234 moves back to its initial position in vertical center as shown in Figure 15. On rebound above the normal of the springs, the piston 234 will move to the left causing progressive restriction of the passage over the valve seat 225 synchronized to the rebound of the spring upwardly above normal and on return from upward rebound to normal as represented by the return of the piston to the vertical center shown in Figure 15, the reverse progressively decreasing restriction of fluid flow takes place as above described. It will therefore be seen that in the oscillating piston type of shock absorber shown in Figures 14-17, the same automatic progressive and synchronized damping action is secured and the same operative principles employed. It will be obvious that in the disk type of shock absorbers shown in Figures 14-17 the shock absorber cylinder is secured to the channel frame or other similar member of a vehicle chassis by means of bolts inserted through the ears 203 shown in Figures 15 and 16 and that the actuating arm 258 is coupled as by the links and spring saddle shown in Figure 1 to the spring anchorage so that the movement of the arm 258 will reflect the flexure of the vehicle supporting springs or the relative movement between the vertical body and axles or other similar relatively movable parts.

Control of the volume of fluid flow which is acted upon by the plunger valve 231 is automatically effected as follows: At a point below the valve seat 225, a tubular web 263 shown in Figure 15, connects the central web 220 of the body 210 and the outer wall of the body 210 adjacent the base of one of its reservoir chambers 221, the bore of this tubular member extending through the side of the body and an alining bore 264 being formed in the cylindrical ring 200 which is formed with a boss 265 at the outer terminus of the bore. A rotatable stem valve 266 extends through the bore 264 and the tubular web 263 to project its inner end in the vertical bore 224 of the central web 220. The inner end of this stem as shown in Figures 14 and 15 is cut down at 267 to half its diameter providing a valve port lying in the vertical bore which port when in the position shown in Figure 14 permits maximum flow of fluid upwardly through the return passage formed by the bore 224. Obviously, when the stem valve 266 is partially turned this passage to the valve seat 225 and ports 228 is restricted and the resistance to the flow of fluid is thereby increased. The stem valve 266 adjacent to its outer end is formed with a collar 268 which in the fully inserted position of the stem valve abuts the base of the internal bore of the boss 265. The interior of the boss bore is threaded and a bushing 269 externally threaded to engage the threaded interior of the boss engages and holds the collar 268 against the base of the boss bore. This bushing is formed internally at its base with a packing groove 270 and is internally threaded to receive an internal packing gland 271. The stem valve projects outwardly beyond the gland 271 for an appreciable distance. Adjacent the packing gland 271 a crank arm 272 (Figure 16) is affixed at its end to the stem valve, and outwardly therefrom on the stem valve a weight arm 273 is affixed to the outer extremity of the stem valve and extends outwardly therefrom as a threaded stem 274 upon which is adjustably threaded a weight disk 275. A coiled spring 276 anchored to the side of the cylinder ring 200 and to the threaded stem 274 normally counter-balances the weight on said stem and maintains the port 267 of the stem valve in the fully opened position shown in Figure 14. The outer end of the crank arm 272 is pivoted to the lower end of a dash pot piston rod 276 depending from a dash pot piston 277 operating in a dash pot cylinder 278 which is generically shown and which will conform structurally with the dash pot 182 shown and described in connection with Figure 13 and therefore need not be detailed herein. To protect the operating parts from corrosion and clogging by mud, sleet, etc., a metal casing 279 (Figure 16) may inclose these parts and be appropriately affixed to the cylindrical ring 200. The operation of the stem valve through the weight arm 273 and the controlling dash pot is similar in all conditions to the described operation of the sleeve valve controlled by the weighted arm and dash pot in Figure 13 and need not be recapitulated.

Similarly, the type of absorber shown in Figures 14-17 may include a fluid passage bleeding the fluid from the common return passage 224 back to the reservoir to reduce the volume of flow during freezing weather in compensation for increased viscosity of the oil or other pressure fluid employed in the shock absorber. Accordingly, as shown in Figures 14 and 15, a horizontal bleeding passage 280 is formed in the central web 220 of the body 210 and extends from a point of communication with the vertical bore 224 below the stem valve 266 and above the diverting check valve 218 outwardly of the web to communicate at its outer end with the transverse slot 255 traversing the web and placing the two reservoir chambers 221 in communication. This passage bore 280 is traversed by a counter-bore 281 receiving a sliding thermostatic valve 282, the valve, bore, and its closures conforming in all essential structural features to the thermostatic valve and its bore shown in Figures 6, 7, 9, and 12 and described in detail in connection therewith so that further detailed illustration and description are unnecessary.

As stated in connection with the rectilinearly reciprocating type of cylinder shown in Figures 1-13, the thermostatic valve may be used in combination with the liquid dash pot or may be dispensed with entirely and the freezing dash pot control function alone in this respect.

Similarly, a safety or excessive pressure blow-off valve may be provided in the oscillating piston type of absorber. As shown in Figures 14 and 17, the inner spring socket 248 of the wing piston is formed with a semi-spherical end 285, this end of the socket communicating through small transverse bores 286 with the cylinder chambers at opposite sides of the wing piston. A ball valve 287 seats in the semi-spherical end 285 of the spring socket under the tension of its spring and normally functions in cooperation with the bores 286 as a check valve during the oscillations of the piston 234. It has a diameter slightly less than that of the semi-spherical end 285 so that under conditions of excessive back pressure against the ball valve, the latter will be forced by the excessive oil pressure outwardly of the socket against the pressure of the spring and will permit the oil to vent through the bores 286 to the opposite side of the wing piston, thereby preventing the pressure reaching the danger point. Obviously the spring used to hold the ball valve 287 to its semi-spherical seat 285 will be precalculated to yield at a pressure short of the danger point.

The same operative principles apply to an oscillating piston disk type shock absorber having double piston wings, this form adapting shock absorbers of this type to heavier work because of the increased damping action secured through the use of double wing piston.

In Figures 23-25, I have shown a double wing oscillating piston shock absorber of the general disk type shown in Figures 14-17. Referring particularly to Figure 23, it will be seen that the outer casing of the shock absorber comprises a cylindrical back casing section 288 having a solid closed back 289 preferably formed integral therewith. Adjacent its front edge this section is reduced in external diameter providing an annular external abutment shoulder 290 and an adjacent outer externally threaded portion 291, which toward the outer edge of the section is further reduced in diameter to provide an annular packing shoulder 292, extending outwardly from this shoulder as a sleeved portion 293 whose outer edge forms an abutment for a rotor retaining and bearing ring.

This cylindrical casing section 288 internally below the outer portion of its externally threaded section 291 is increased in internal diameter providing an annular rotor stop and bearing shoulder 294 and an outer annular rotor bearing surface 295 terminating outwardly with the sleeved portion 293. The outer section of cylindrical casing is specifically designed and constructed for cooperation with the rotor and wing piston and will be described in connection therewith.

The interior of the rear casing section 288 forms the chambers for the double wing pistons and mounts cooperating abutments. To this end a tapering semi-circular groove is cut in the interior face of the cylindrical section 288 from the shoulder 294 rearwardly to the back 289. A block abutment 297 is provided having a depth coincident with that of the internal surface of the cylinder 288 from its back 289 to its shoulder 294 and extending diametrically across the interior of the cylinder partitioning it into two opposite piston chambers 298 and 299 (Figure 24). The block 297 is formed as two wings 300 and 301 tapering outwardly from its center which is formed with a circular socket 302 therein (Fig. 23) providing a bearing for an axial hub 303 having diametrically opposed flat faced wing pistons 304 extending radially outward therefrom and preferably formed integrally therewith, these piston wings having a greater depth than that of the socket 302 to engage the back wall 289 of the casing as shown in Figure 23 and extending into the chambers 298 and 299 as shown in Figure 24. The outer ends of the hub 303 and wing pistons 304 extend outwardly beyond the block 297 to seat in a rotor member hereinafter described. The outer faces of the pistons are curved to coincide with and bear on the internal walls of the cylindrical casing 288.

One of the wing portions of the block 297, as shown, the upper wing 300 is solid and has its upper edge formed with a tapering semi-circular groove 306 therein which is alined with the corresponding groove 296 of the casing 288 and is fixed in the casing by a taper pin 307 driven therein. The other wing 301 of the block is fixed to the casing by the stem of a volume control valve which extends through the casing into said wing portion as will be later described.

The hub 303 of the double winged piston is traversed by bores 308 and 309 relatively staggered and quartering the hub as shown in Figure 24, these bores providing chamber filling and also pressure equalizing passages of restricted diameter by means of which oil or other fluid is forced from the pressure side of the wing piston opposed to and moving toward the solid abutment wing 300 back to the pressure chamber at the opposite side in advance of the pressure face of the other piston to be forced thereby under pressure through the valve controlled fluid passages in the wing section 301.

The wing portion 301 of the fixed abutment block is bored to provide a plurality of fluid passages and to house controlling valves. Communication for fluid passage between the piston chambers 298 and 299 at opposite sides of the abutment wing 301 is afforded by a slot 310 traversing the outer faces of this abutment wing. This slot is shown in Figure 23 and is indicated as to position and extent by dash and dot lines in Figure 24, and also serves as a passage by means of which the oil or other fluid is supplied to these chambers from a reservoir at the outer side of the casing as will be later explained.

The lower abutment wing section 301, as viewed in Figures 23-24, adjacent its outer bearing edge and rear face is traversed by alined bores 312, 313 (Figure 25), spaced at their confronting ends by the bore of a circular socket 314 of substantially greater diameter formed in the rear face of the wing 301 abutting the casing back 289 and extending with its axis at right angles to the axis of the bores 312, 313. In this socket 314, is inserted a tightly fitting sleeve 315 having a square axial socket therein in which is tightly fitted a squared plug 316. The sleeve 315 in line with the passages 312, 313 is formed with alining cross bores 317 of coincident diameter. The plug 316, in alinement with the passages 312, 313 and bores 317 is provided with an alining bore 318 of greater diameter in which is loosely fitted a ball valve 319 of less diameter than the bore 318 but greater diameter than the bores 317 and passages 312, 313. This ball functions as a check valve closing the opposite bores 317 in alternation in response to the pressure of fluid forced through the passages 312, 313 upon alternating pressure strokes of the double wing piston 304, and diverts the flow of fluid from the bore 318 through a communicating bore 320 extending at right angles thereto and outwardly through the plug 316.

The bore 320 is alined and communicates with a horizontal bore 321 extending forwardly through the abutment wing 301 and is joined at its forward end to the lower end of a vertical bore 322 which extends upwardly to the socket 302 and is formed with an outwardly tapering enlargement 323 at its upper end which provides at its lower end junction with the upper end of bore 322, a seat 324 for a ball valve 325. The taper of the bore 322 provides for progressive increase and decrease of fluid flow restriction as the ball is forced toward and away from its seat.

Movement of the ball valve toward its seat is effected by the cam action of a flat face 326 formed upon the peripheral face of the hub 303 above the tapered bore 323 by rotation of the hub as the wing pistons 304 are oscillated. As will be seen from Figure 24, the flat cam face, in the neutral position of the wing pistons shown, does not extend beyond the hub engaging face of the socket 302. Oscillation of the hub and its attached pistons will, however, move the flat cam face to clear the edge of the socket and permit the oil or other fluid to be forced upwardly past the ball valve 325 and over the upper edge of the tapering bore enlargement into the chambers 298, 299. Upon the return movement of the hub, the ball valve is held against the cam surface 326 by the skin friction of the oil forced upwardly through passage 322 so that the restriction of the outlet at the tapered upper end of the passage 322 is progressively increased or decreased as permitted by the cam surface, the action being the same as in the form of shock absorber shown in Figures 14–17.

The volume of flow of the fluid through the common return passage, to the chambers 298, 299 provided by bore 320, horizontal passage 321, vertical passage 322 and its enlargement 323, is controlled by a rotatively adjustable stem valve 327 extending upwardly from the exterior of the casing section 288 at its base through a vertical bore 328 therein, through an alined vertical bore 329 in the lower end of the abutment wing 301 (thereby keying the wing 301 to the casing 288) to project its inner and upper end into the horizontal section 321 of the fluid return passage, between the diverting check valve 319 and the vertical bore leading to the damping pressure synchronizing ball valve 325. The end of the stem valve 327 projects into and spans the passage 321 and is longitudinally bisected within the passage as shown at 330, Figures 23 and 24, so that rotation of the stem will function variably to restrict the area of the passage and thereby variably control and determine the volume of fluid which is permitted to pass upwardly through the passage bore 322 for the progressive synchronized restricting or damping action of the cam control ball valve 325. The stem valve provides therefore a primary damping control of volume flow adjustable to road conditions and liquid viscosity as determined by temperature. The cam and ball valve provide a second stage of damping control in which the movement of the ball valve progressive to restrict or increase the area for the passage of the pressure fluid thereby and thereby to vary the resistance to flow and the damping action, is synchronized through oscillation of the hub and its cam and coincident piston oscillation to the amplitude and force of the shock received as reflected in the extent of piston oscillation and the time period thereof.

A safety factor preventing damage by excessive pressure is provided by a ball check valve 331 seating in the rounded rear end of a socket 332 formed in the outer edge of one wing piston 304 under the pressure of a coiled spring 333 (Figure 23), the rear end of the socket at opposite sides of the ball valve seat being traversed by counterbores 334, the action being in all respects similar to that of the ball valve 287 in the form shown in Figures 14–17. Only one such safety valve need be used in the double wing piston due to the pressure equalizing passages 308, 309 which place the pressure face sides of both wing pistons in communication.

The stem valve bore 328 in the casing section 288 at the exterior of the casing is shouldered, enlarged and extended with a boss 335 in which is seated a packing collar 336, bushing 337 and packing gland 338 being identical with the similarly functioning elements 268—271 of the single wing piston form shown in Figure 15. The outer and lower end of the stem valve 327 extends outwardly beyond the packing gland and is provided with a valve adjusting pointer arm 339, the position of which will indicate the adjustment affected.

The outwardly projecting portions of the wing pistons 304 and their integral hub 303 seat in an axial socket and radial slots formed in the inner face of a rotor member 340 which, as seen in Figure 23, is provided at its inner end with an annular bearing flange 341 which abuts the annular shoulder 294 with its inner face and has its peripheral surface contacting and bearing on the inner face of the sleeve 293. This rotor or hub member is formed with a tapered socket 342 in its outer face edged by an annular series of splines or teeth correspondingly tapered. At its outer face the rotor member 340 is formed with an annular groove 343 outwardly of its tapered socket having packing receiving offsets therein. The flange 341 terminates at its outer edge in line with the outer edge of the sleeve 293 and is held with its inner face against the shoulder 294 by means of a flanged ring 344 engaging thereover and over the outer edge of the sleeve 293. This ring has its outer peripheral face seated in an annular channel 345 formed in the inner peripheral face of an outer cupped casing section 346 at a point intermediate its inner and outer ends, the shoulder 347 at the outer edge of this channel overlying the outer face of the ring 344, holding it firmly against the bearing flange 341 of the rotor member. Preferably packing is interposed between the inner end of the flange of the ring 344 and the shoulder 292, being held in the groove thus provided by the adjacent inner face of the cupped casing section 346 at its inner end, which face at that end is threaded over the threaded portion 291 of the rear cylindrical casing section 288 and engages the shoulder 290 thereof.

The cupped outer casing section 346 has its outer face formed with a large central bore therethrough through which the outer shouldered end of the rotor member 340 extends and against which it bears, the packing groove 343 being opposed to the side of this central bore, the inner face of the cupped casing section 346 at the edge of said bore overlying the annular groove 343 and serving tightly to compress the packing therein when the cupped casing section is screwed up tightly over the threaded outer end 291 of the cylindrical rear casing section 288. The diameter of the outer casing section 346 is internally greater than the external diameter of the rotor member 340 therewithin so that an annular space is formed which constitutes an outer fluid reservoir. A screw plug 348 closes a threaded filling bore 349 in the upper end of the outer casing section 346 and has a bore therethrough in which is seated a pulsating valve which as shown may take the form of a cotter pin 350 having a coil spring interposed between its outer bent feet and the plug 348 and permitting intake and egress of air in the outer fluid reservoir as the wing pistons 304 are oscillated. A pulsating valve is necessary since the outer fluid reservoir space is subjected to the suction of the damping fluid through a fluid feeding passage 351 shown in dotted lines in Figure 23 which extends downwardly through the rotor member 340 to communicate with the slot 310 traversing the lower web portion 341 of the stationary abutment member and thereby conveying fluid from the outer reservoir space through the passage 351 and slot 310 to the opposite lower chambers 298 and 299 from whence it passes upwardly to the upper chambers through the quartering bores 308 and 309 in the hub 303 of the wing pistons so that the inner fluid holding chambers 298 and 299 are placed in communication with the outer fluid reservoir. A check valve opening inwardly in response to suction in a chamber 298, 299, and closing to check out flow responsively to pressure from said chambers, is provided preferably at the inner end of passage 351. The enlarged inner extremity of this passage is threaded to receive an externally threaded gland 358 having a cross pin 359 therein retaining a ball valve 360 between it and the adjacent restricted end of passage 351 and permitting movement of the ball in response to suction and pressure from and to positions closing the adjacent end of passage 351.

At the base of the tapered socket 342 of the rotor member 340, a threaded socket 352 is formed. An actuating arm 353 corresponding to the actuating arm 258 of the single wing piston type of suction absorber shown in Figures 14–17 is provided at its inner end with a tapered head 354 having spline teeth interfitting with the spline teeth of the tapered socket 342. This head 353 has an axial bore therethrough through which extends a securing bolt 355 whose inner threaded end engages in the threaded socket 352 and holds the spline connection of the actuating arm thereto. The head of the bolt 355 preferably seats within a socket 356 formed in the outer face of the head 353.

Motion imparted to the actuating arm 353 by movement of a spring suspended body will oscillate the rotor member 340 and oscillate the double wing piston 304 from the central idler position shown in Figure 24, in opposite directions. Oscillation of the right hand wing piston in Figure 24 downwardly to the right will force the fluid such as oil with which the piston chamber 299 therebelow is filled through the passage 313 to force the check ball valve 319 to close the opposite alined passage 312 and divert the fluid through passage 320, past the volume control valve 330 and upwardly through passage 322 to the progressively acting synchronized ball valve 399 past which the oil escapes into the chambers 298 or 299 depending upon the direction of oscillation of the hub 303. During this downward movement of the right hand wing piston 304, the fluid above the opposite wing piston is subjected to pressure between coincident upward movement of that piston and is forced through the quartering bore 308 into the opposite and lower chamber 299 in advance of the active face of the right hand piston 304 to equalize the pressure at opposite sides of the double wing piston. Upon reverse oscillatory movement of the double wing piston, the left hand piston 304 moves downwardly, forcing the fluid under pressure through passage 312, forcing the ball check valve 319 to close the opposite passage 313 and divert the pressure fluid through passage 320 to the horizontal bore 321 and upwardly through the vertical bore 322 for the restricting and damping action of the progressively cam actuated ball valve 325 which, in its function and action, corresponds to the projectile type valve 231 of Figures 14–17 and to the projectile type valve 50 of Figures 7, 9 and 10, for example. In this downward movement of the left hand piston wing 304 as viewed in Figure 24, the fluid compressed between the abutment wing 300 and the right hand piston 304 which moves coincidently upwardly toward said wing, passes through the quartering bore 309 downwardly in advance of the active face of the left hand piston wing 304 to equalize pressures at opposite sides of the double wing piston as in the first direction of oscillation.

It will be seen therefore that in its action, the double wing piston type of absorber employs the same operative principles and fundamentals of control found in the single wing type of piston and the first described form of the invention.

In all the types of shock absorbers here described, the same operative principles of control apply and the claims following, I desire to be understood that by the term cylinder and reciprocating piston, unless otherwise qualified, I intend to include both pistons of the straight line reciprocating and oscillating types. And by "synchronized" or "synchronism" I mean to include both the time factor representing the speed of the vehicle or other body as reflected in the time period of spring flexure or relative movement and the factor of amplitude or extent of movement as reflected in the size, nature or impulsive force of the shock producing obstacle or impulse.

What I claim, therefore, and desire to secure by Letters Patent is:

1. A spring damping shock absorber for vehicle bodies suspended by springs having a fluid filled cylinder mounting a piston therein for movement in opposite directions from an intermediate position, a fluid reservoir and a circulating passage connecting the reservoir with the cylinder through which passage the fluid is forced in the single direction of the reservoir by piston movement in opposite directions, means for effecting movement of the piston in synchronism with spring movement, and means mounted in said passage and movable in synchronism with piston and spring movement progressively to restrict the flow of fluid through said passage to apply damping force to spring flexure down and up from normal in synchronism to movement of the spring and to its progressively increasing resistance to flexure, and reversely movable progressively to decrease the attained restriction of said passage to progressively decrease damping force applied to rebound of the spring up to and down to normal in synchronism with the rebound movement of the spring and with the progressive decrease of its rebound force.

2. A spring damping shock absorber for vehicle bodies suspended by springs, having a fluid filled cylinder mounting a piston therein for movement in opposite directions from an intermediate position, a fluid reservoir and a circulating passage connecting the reservoir with the cylinder through which passage the fluid is forced in the direction of the reservoir by piston movement in opposite directions, means for effecting movement of the piston in synchronism with spring movement, a valve member mounted in said passage, means for bodily moving said member against the flow of fluid through said passage in synchronism with piston and spring movement progressively to restrict said passage and the flow of fluid to apply damping force to spring flexure down and up from normal in synchronism to movement of the spring and to its progressively increasing resistance to flexure, and for reversely moving said member progressively to enlarge said passage to increase the flow volume and progressively decrease the damping force applied thereby to rebound the spring up to and down to normal in synchronism with the rebound movement of the spring and with the progressive decrease of its rebound force, and means for determinately varying the volume of fluid circulated by reciprocal cation of the piston and flowing through said passage to said valve member.

3. A spring damping shock absorber for vehicle bodies suspended by laminated springs comprising a body having a fluid filled piston chamber therein, a piston movable in said chamber in opposite directions from an intermediate position, a fluid reservoir ported into filling communication with the piston chamber at opposite sides of the piston in reverse directions of piston movement, a single passage communicating with the opposite ends of the piston chamber and with said reservoir through which fluid is circulated under pressure in the direction of the reservoir by movement of the piston in opposite directions, means for moving said piston in synchronism with spring movement, means coincidently operable for progressively restricting the flow of fluid through said single passage during spring flexure up and down from normal synchronously with the movement of the spring and with the progressively increasing resistance to flexure of the spring laminations and for progressively decreasing the attained restriction upon rebound of the spring up to and down to normal in synchronism with the rebound movement of the spring and with the progressive decrease of rebound force of its laminations.

4. A spring damping shock absorber for vehicle bodies suspended by leaf springs comprising a damping cylinder body housing a fluid filled piston chamber, a piston mounted in said chamber for reciprocation in opposite directions from an intermediate position, a fluid filled reservoir ported into suction-controlled communication at the piston chamber at opposite sides of the piston on alternate reciprocations of the piston therein, a single fluid passage connecting said reservoir with the piston chamber at the ends of opposite piston reciprocating movements therein and through which passage fluid is circulated under piston pressure in the one direction of the reservoir by reciprocation of the piston, in opposite directions, means for effecting reciprocation of the piston in synchronism with movement of a suspending spring, a flow controlling member bodily movable in said passage against the flow of fluid therethrough and cooperating with said passage to restrict and enlarge the flow area of the passage, respectively, and means cooperating with said member and actuated in synchronism with piston and spring movement to cause said member progressively to restrict said passage and thereby apply progressively increasing damping force to spring movement in synchronism with spring flexure up and down from normal and with the progressively increasing resistance to flexure of the spring, and alternately to progressively increase the area of said passage and progressively decrease the damping force applied to the spring in synchronism with the rebound of the spring up to and down to normal with the decrease of damping force synchronized to the progressive decrease of rebound force of the spring laminations.

5. A spring damping shock absorber for vehicle bodies suspended by laminated springs comprising a body having a fluid filled piston chamber housing a piston therein for reciprocation in opposite directions from an intermediate position and having a fluid reservoir ported into filling communication with the piston chamber at opposite sides of the piston in reverse directions of piston movement, fluid discharge passages leading from opposite sides of the piston chamber, a common fluid return passage communicating with said discharge passages and with said fluid reservoir, through which passage fluid is forced under pressure in the direction of the reservoir by opposite reciprocations of the piston, means operated by spring movement for effecting reciprocation of the piston in synchronism therewith and including a valve activator, and a valve member interposed in said return passage and bodily moved by said activator against the flow of fluid through said return passage coincidently with piston movement progressively to restrict said passage to increase progressively the applied damping force in synchronism with the flexure of the spring downwardly and upwardly from normal and with the progressively increasing resistance of the spring to flexure, and held by fluid pressure against said activator and moved thereby as permitted by said activator to progressively open said passage and decrease the applied damping force in synchronism with the rebound of the spring upwardly to and downwardly to normal and with the progressive decrease of the force of rebound of the spring laminations.

6. A motion damping device for relatively movable bodies comprising a member attachable to one body having a fluid-filled cylinder, a piston housed therein for reciprocation in opposite directions from an intermediate position, and a fluid reservoir ported into suction controlled, filling communication with said cylinder at opposite sides of the piston upon successive reciprocating movements thereof, means connected with said piston and connectible to the other of said relatively movable bodies for effecting reciprocation of said piston in synchronism with such relative movement, fluid discharge passages in said member extending from said cylinder at opposite sides of the piston into and through which passages fluid from the cylinder is discharged under pressure by reciprocations of the piston, a single return passage common to and communicating with each of said discharge passages and with said reservoir into which return passage said discharged fluid is forced in the direction of said reservoir, an actuator movable coincidently with said piston, a valve member seating and bodily movable in said return passage cooperating therewith progressively to decrease and increase the permissible volume of fluid flow therethrough to the reservoir and bodily movable by said actuator against the flow of fluid progressively to restrict said passage and volume of flow and reversely movable progressively to decrease passage restriction and increase volume of flow, said valve member being maintained in cooperative relation to its actuator by the friction thereagainst of the fluid flow through said return passage.

7. A motion damping device for relatively movable bodies comprising a member attachable to one body having a fluid-filled cylinder, a piston housed therein for reciprocation in opposite directions from an intermediate position, and a fluid reservoir ported into suction controlled, filling communication with said cylinder at opposite sides of the piston upon successive reciprocating movements thereof, means connected with said piston and connectible to the other of said relatively movable bodies for effecting reciprocation of said piston in synchronism with such relative movement, fluid discharge passages in said member extending from said cylinder at opposite sides of the piston into and through which passages fluid from the cylinder is discharged under pressure by reciprocations of the piston, a single return passage having one end communicating with said reservoir and its other end joining the ends of said discharge passages, fluid pressure operated valving means for diverting the discharged fluid from said discharge passages to said single return passage in alternation, an actuator movable coincidently with said piston, a valve member seating and bodily movable in said return passage cooperating therewith progressively to decrease and increase the permissible volume of fluid flow therethrough to the reservoir and bodily movable by said actuator against the flow of fluid progressively to restrict said passage and volume of flow and reversely movable progressively to decrease passage restriction and increase volume of flow, said valve member being maintained in cooperative relation to its actuator by the friction thereagainst of the fluid flow through said return passage.

8. A spring damping shock absorber for relatively movable bodies having a fluid filled damping cylinder, a piston housed therein for reciprocation in opposite directions from an intermediate position and having a fluid reservoir ported by piston suction into filling communication with the cylinder at opposite sides of the piston in reverse directions of piston movement, fluid discharge passages leading from said cylinder at opposite sides of the piston into and through which passages fluid from the cylinder is discharged under pressure by reciprocations of the piston, a single return passage having one end communicating with said reservoir and its other end joining the ends of said discharge passage, a check valve interposed between said ends of the discharge passages and said single return passage and operable responsively to fluid pressure in said passage on alternate strokes of the piston to divert the fluid from said discharge passages into said single return passage in alternation, an actuator cam movable coincidently with said piston, a floating projectile type valve member in said single return passage between said check valve and the fluid reservoir cooperating with said actuator and said return passage and bodily moved by said cam against the flow of fluid through said passage progressively to decrease the permissible volume of flow through said passage to the reservoir in synchronism with pressure creating movement of the piston in opposite directions from its intermediate position, said valve member being maintained in cooperative relation to said actuator by the friction thereagainst of the fluid flow through said return passage and being moved by said friction as permitted by said actuator cam upon movement thereof coincidently with return movement of the piston to intermediate position progressively to increase the permissible volume of flow through said passage in synchronism with said return movement of the actuator cam.

9. A spring damping shock absorber for relatively movable bodies having a fluid filled damping cylinder, a piston housed therein for reciprocation in opposite directions from an intermediate position and having a fluid reservoir ported by piston suction into filling communication with the cylinder at opposite sides of the piston in reverse directions of piston movement, fluid discharge passages leading from said cylinder at opposite sides of the piston into and through which passages fluid from the cylinder is discharged under pressure by reciprocations of the piston, a single return passage having one end communicating with said reservoir and its other end joining the ends of said discharge passage, a check valve interposed between said ends of the discharge passages and said single return passage and operable responsively to fluid pressure in said passage on alternate strokes of the piston to divert the fluid from said discharge passages into said single return passage in alternation, an actuator cam movable coincidently with said piston, a floating projectile type valve member in said single return passage between said check valve and the fluid reservoir cooperating with said actuator and said return passage and bodily moved by said cam against the flow of fluid through said passage progressively to decrease the permissible volume of flow through said passage to the reservoir, in synchronism with pressure creating movement of the piston in opposite directions from its intermediate position, said valve member being maintained in cooperative relation to said actuator by the friction thereagainst of the fluid flow through said return passage and being moved by said friction as permitted by said actuator cam upon movement thereof coincidently with return movement of the piston to intermediate position progressively to increase the permissible volume of flow through said passage in synchronism with said return movement of the actuator cam, and a rotatable valve member traversing said return passage between said fluid diverting check valve and said cam operated projectile valve member, and having a fluid port therein alining with said return passage and rotatable from a position of full volume flow to positions variably restricting the volume of flow therethrough to said projectile valve, and means for adjustably turning said valve member to variably regulate said volume flow.

10. A spring damping shock absorber for vehicle bodies suspended by springs having a fluid filled cylinder mounting a piston therein for reciprocation in opposite directions from an intermediate position, a fluid reservoir and a circulating passage connecting the reservoir with the cylinder through which passage the fluid is forced in the single direction of the reservoir by piston reciprocation in opposite directions, means for effecting reciprocation of the piston in synchronism with spring movement, and means mounted in said passage and movable in synchronism with piston and spring movement progressively to restrict the flow of fluid through said passage to apply damping force to spring flexure down and up from normal in synchronism to movement of the spring and to its progressively increasing resistance to flexure, and reversely movable progressively to decrease the attained restriction of said passage to progressively decrease damping force applied to rebound of the spring up to and down to normal in synchronism with the rebound movement of the spring and with the progressive decrease of its rebound force, a fluid bleeding by-pass connecting said reservoir with said circulating passage at a point in advance of the said restricting means in said passage, and a thermostatically controlled valve interposed in said bleeding by-pass and effective to open said by-pass at low temperatures producing increase in the viscosity of the pressure fluid.

11. A spring damping shock absorber for vehicle bodies suspended by laminated springs, having a fluid filled cylinder mounting a piston therein for reciprocation in opposite directions from an intermediate position, a fluid reservoir and a circulating passage connecting the reservoir with the cylinder through which passage the fluid is forced in the direction of the reservoir by piston reciprocation in opposite directions, means for effecting reciprocation of the piston in synchronism with spring movement, and means mounted in said passage and movable in synchronism with piston and spring movement progressively to restrict the flow of fluid through said passage to apply damping force to spring flexure down and up from normal in synchronism to movement of the spring and to its progressively increasing resistance to flexure, and reversely movable progressively to enlarge said passage to progressively decrease damping force applied to rebound of the spring up to and down to normal in synchronism with the rebound movement of the spring laminations, and means for determinately controlling and varying the volume of fluid forced by reciprocation of the piston through said passage to said restricting means mounted in the passage.

12. A spring damping shock absorber for an individual spring of a vehicle body suspended by springs, said shock absorber having a fluid filled cylinder mounting a piston therein for reciprocation in opposite directions from an intermediate position, a fluid reservoir and a circulating passage connecting the reservoir with the cylinder, through which passage the fluid is forced in the single direction of the reservoir by piston reciprocation in opposite directions, means for effecting reciprocation of the piston in synchronism with spring movement, and means mounted in said passage and movable in synchronism with piston and spring movement progressively to restrict the flow of fluid through said passage to apply damping force to spring flexure down and up from normal in synchronism with movement of the spring and with its progressively increasing resistance to flexure, and reversely movable progressively to enlarge said passage to progressively decrease damping force applied to rebound of the spring up to and down to normal in synchronism with the rebound movement of the spring and with the progressive decrease of rebound force of the spring laminations, and a control for the shock absorber operable determinately to vary the volume of fluid forced by reciprocation of its piston through said passage to the restricting means therein.

13. A spring damping shock absorber for vehicle bodies suspended by springs having a fluid filled cylinder mounting a piston therein for reciprocation in opposite directions from an intermediate position, a fluid reservoir and a circulating passage connecting the reservoir with the cylinder through which passage the fluid is forced in the single direction of the reservoir by piston reciprocation in opposite directions, means for effecting reciprocation of the piston in synchronism with spring movement, and means mounted in said passage and movable in synchronism with piston and spring movement progressively to restrict the flow of fluid through said passage to apply damping force to spring flexure down and up from normal in synchronism to movement of the spring and to progressively increasing resistance to flexure, and reversely movable progressively to decrease the attained restriction of said passage to progressively decrease damping force applied to rebound of the spring up to and down to normal in synchronism with the rebound movement of the spring and with the progressive decrease of its rebound force, a rotatable valve interposed in said passage between its connection with the cylinder and said movable restricting means, said valve having a fluid passage port therein alining with said passage and rotatable variably to restrict the volume of flow therethrough, means for rotating said valve including an actuating arm and a dash pot connected to and controlling movement of said arm, and means normally tending to hold said arm and valve with the port of the latter in full volume flow position, said dash pot having a liquid chamber with liquid therein congealable at freezing temperatures to prevent movement of said arm from normal full volume flow position of said valve.

14. A motion damping device for relatively movable bodies comprising a member attachable to one body having a viscous liquid fluid-filled cylinder, a piston housed therein for reciprocation in opposite directions from an intermediate position, a fluid reservoir ported into suction controlled communication with said cylinder at opposite sides of the piston upon successive reciprocating movements thereof, means connected with said piston and connectible with the other of said relatively movable bodies for effecting reciprocation of said piston in synchronism with said relative movement, fluid discharge passages in said member with inner terminals extending from said cylinder at opposite sides of the piston, a single return passage common to and communicating with the outer terminals of said discharge passages, and with said fluid reservoir means interposed between said outer terminals and said return passage effective to direct the discharged pressure fluid from said discharge passages into said return passage in alternation, and damping means for varying the permissible flow area for the pressure fluid including a secondary movable passage restricting and enlarging member in said return passage and an actuator therefor operatively connected with and actuated in synchronism with said piston to cause movement of said member progressively to restrict and enlarge the permissible flow area through the return passage in synchronism with piston movement from and to its intermediate position, respectively, and a primary flow volume controlling valve between said secondary member and said piston, said valve having an actuating means automatically operable responsively to and in synchronism with the impulse producing relative movement of said bodies to operate said primary valve to restrict the flow volume and normally counter-balanced to maintain full volume flow and a liquid holding dash pot connected with said actuating means to retard return movement thereof from restricted to full flow volume position of the valve, the dash pot liquid being congealable at freezing temperatures to prevent automatic operation of said actuating means and maintain full volume flow in compensation for increased viscosity of the pressure fluid liquid at freezing temperatures.

15. A motion damping device for spring suspended vehicle bodies having a fluid filled cylinder mounting a piston therein for reciprocation in opposite directions from an intermediate neutral position, a fluid reservoir ported into communication with said cylinder by piston suction in opposite directions of piston reciprocation, fluid discharge passages leading from opposite ends of said cylinder, a single return passage having one end communicating with said reservoir and having its other end ported into alternate communication with said discharge passages by reverse reciprocating movements of said piston, adjustable damping means for restricting the flow of fluid through said return passage, and manually operable hydraulic means operative from a remote point for adjusting said damping means.

16. A motion damping device for spring suspended vehicle bodies having a fluid filled cylinder mounting a piston therein for reciprocation in opposite directions from an intermediate neutral position, a fluid reservoir ported into communication with said cylinder by piston suction in opposite directions of piston reciprocation, fluid discharge passages leading from opposite ends of said cylinder, a single return passage having one end communicating with said reservoir and having its other end ported into alternate communication with said discharge passages by reverse reciprocating movements of said piston, a damping valve interposed in said return passage for varying the volume of fluid flow therethrough, means normally tending to maintain said valve positioned for maximum fluid flow therethrough, a weighted arm operatively connected with said valve and actuable by shock imparted movement to move said valve to restrict fluid flow proportionately to shock impulse, and a dash pot connected to said arm to retard its return movement from shock imparted position.

17. A motion damping device for spring suspended vehicle bodies having a fluid filled cylinder mounting a piston therein for reciprocation in opposite directions from an intermediate neutral position, a fluid reservoir ported into communication with said cylinder by piston suction in opposite directions of piston reciprocation, fluid discharge passages leading from opposite ends of said cylinder, a single return passage having one end communicating with said reservoir and having its other end ported into alternate communication with said discharge passages by reverse reciprocating movements of said piston, a damping valve interposed in said return passage for varying the volume of fluid flow therethrough, means normally tending to maintain said valve positioned for maximum fluid flow therethrough, a weighted arm operatively connected with said valve and actuable by shock imparted movement to move said valve to restrict fluid flow proportionately to shock impulse, a dash pot connected to said arm to retard its return movement from shock imparted position, said dash pot having a liquid reservoir in suction ported communication with its piston having a filling of liquid congealable at freezing temperature.

18. A motion damping device for spring suspended vehicle bodies having a fluid filled cylinder mounting a piston therein for reciprocation in opposite directions from an intermediate neutral position, a fluid reservoir ported into communication with said cylinder by piston suction in opposite directions of piston reciprocation, fluid discharge passages leading from opposite ends of said cylinder, a single return passage having one end communicating with said reservoir and having its other end ported into alternate communication with said discharge passages by reverse reciprocating movements of said piston, damping means in said return passage for restricting the flow of fluid therethrough, a bleeding by-pass communicating with said reservoir and with a fluid flowing passage in advance of said damping means, and a thermostatically operated valve interposed in said by-pass.

19. A motion damping device for spring suspended vehicle bodies comprising a ring-like cylinder having a closure at its inner end providing an end bearing face, a substantially semi-cylindrical body keyed in said cylinder providing a piston chamber thereabove and having an axial depression forming a bearing and cored to provide a fluid reservoir, and fluid passages communicating therewith and with said piston chamber, a hub rotor shaft seating in said bearing depression, a wing piston seated on said rotor shaft and engaging said end bearing face and the walls of said cylinder under tension, said wing piston projecting outwardly beyond said rotor shaft and semi-cylindrical body, a cupped closure engaging and closing the outer end of said cylinder, a rotor journaled therein having a flanged head bearing upon the walls of said cylinder and slotted to key the projecting portion of said wing piston thereto, an actuator connected with and extending from said rotor, and damping means in one of said fluid passages for restricting the flow of fluid therethrough.

20. A spring damping shock absorber for an individual spring of a vehicle body suspended by springs having a fluid filled cylinder mounting a piston therein for reciprocation in opposite directions from an intermediate position, a fluid reservoir and a circulating passage connecting the reservoir with the cylinder through which passage the fluid is forced in the direction of the reservoir by piston reciprocation in opposite directions, a rotatable valve interposed in said circulating passage for controlling the volume of flow through said passage, a cylinder housing a piston operatively connected with said valve for effecting rotation thereof to restrict said flow, means normally tending to move said piston to rotate said valve to maximum flow position, a control for the piston of the shock absorber comprising a fluid filled cylinder mounting a fluid pressure creating piston therein, means adapted to be mounted on the vehicle dash manually operable to effect movement of said piston, and a fluid conduit connecting said fluid cylinder with the cylinder of the valve operating piston of said shock absorber.

21. In a shock absorber for spring suspended vehicles, a cylinder body containing a fluid reservoir and housing a reciprocable piston and providing two opposed fluid pressure chambers in which said piston is reciprocated in alternation by the successive flexure and recoil of the vehicle springs, fluid discharge passages leading from each of said pressure chambers, a single return passage leading to said reservoir, and means for passing fluid forced by piston pressure through said discharge passages back to said reservoir through said single return passage, adjustable valve means in said single passage for controlling the flow of liquid therethrough, and valve-actuating means for effecting adjustment of said valve means.

22. In a shock absorber for spring suspended vehicles, a cylinder body containing a fluid reservoir and housing a reciprocable piston and providing two opposed fluid pressure chambers in which said piston is reciprocated in alternation by the successive flexure and recoil of the vehicle springs, fluid discharge passages leading from each of said pressure chambers, a single return passage leading to said reservoir, means for passing fluid forced by piston pressure through said discharge passages back to said reservoir through said single return passage, a primary volume flow controlling valve in said return passage with means externally of the cylinder body for adjusting said valve and a secondary and variable volume-restricting valve in said passage between said primary valve and the fluid reservoir with means for operating said valve through spring flexure and recoil variably to restrict said passage in synchronism with spring movement in both time and amplitude.

23. In a shock absorber for spring suspended vehicles, a cylinder body containing a fluid reservoir and housing a reciprocable piston and providing two opposed fluid pressure chambers in which said piston is reciprocated in alternation by the successive flexure and recoil of the vehicle springs, fluid discharge passages leading from each of said pressure chambers, a single return passage leading to said reservoir, means for passing fluid forced by piston pressure through said discharge passages back to said reservoir through said single return passage, a primary volume flow controlling valve in said return passage with means externally of the cylinder body for adjusting said valve and a secondary and variable volume-restricting valve in said passage between said primary valve and the fluid reservoir with means for operating said valve through spring flexure and recoil variably to restrict said passage in synchronism with spring movement in both time and amplitude, a bleed passage extending from said single return passage at a point between said two valves and said discharge passages to the fluid reservoir, and a third and temperature controlled valve in said bleed passage operable to bleed fluid from said single return passage to decrease the volume of fluid flowing to said secondary valve at low air temperatures.

24. In a shock absorber, a cylindrical outer casing, an oscillating wing piston therein having a hub journaled at one end in one end of said casing, a rotor journaled in the opposite end of said casing having an inner face provided with an axial socket therein to receive the opposite end of said piston hub and having a radial slot in said face to receive and key the wing piston thereto, and means for oscillating said rotor.

25. In a shock absorber, a cylindrical outer casing having an annular bearing surface internally thereon intermediate of its ends edged by annular shoulders, a piston mounted in one end of said casing, a rotor in the other end of said casing operatively connecting with said piston and having a bearing flange thereon engaging said annular bearing surface and held against endwise movement by the thrust bearings provided by said edging annular shoulders.

26. In a shock absorber, the combination of a cylinder having a fluid chamber therein, a piston operating in said chamber, a passageway leading from said chamber, a main valve for said passageway, a bypass connected with the passageway between the main valve and the chamber, means controlling fluid flow through said bypass, and thermostatic means acting on said last-mentioned controlling means.

27. In a shock absorber, the combination of a cylinder having a fluid chamber therein, a piston operating in said chamber, a main passageway leading from said chamber, a main valve for said passageway, means for controlling said main valve, a bypass connected with the passageway between the main valve and the chamber, and thermostatically controlled means for regulating fluid flow through said bypass.

28. In a fluid shock absorber for a vehicle, the combination of compression means having a single discharge duct with at least two outlets therefrom, said duct being so connected with the compression means as to have fluid pass therethrough from both impact and recoil activation of the compression means, and thermostatic means for regulating only one of the outlets.

29. In a fluid shock absorber for a vehicle, the combination with a cylinder having a piston mounted therein for movement in different directions upon impact and recoil of the shock absorber, said cylinder having a single discharge duct connected therewith for the passage of fluid through said duct by both impact and recoil activation of the piston, said duct having two outlets therefrom for the fluid, and thermostatic means for controlling only one of said outlets.

30. In a fluid shock absorber for vehicles, the combination of a compression element, chambers therefor alternately under compression in response to impact and recoil from road shocks, a fluid reserve chamber, a plurality of ducts connecting the compression chambers with the reserve chamber, valve means for regulating one of said ducts, and thermostatic valve means for regulating another of said ducts.

31. In a fluid shock absorber for vehicles, the combination of a cylinder having a piston mounted therein for oscillatory movement for impact and recoil, said shock absorber having at least two valving means for controlling both impact and recoil, one valving means being adjustable for regulating a fixed orifice ratio of volumetric fluid flow under compression at all temperatures, and a second of said valving means being self-adjustable thermostatically in amplification of the first-mentioned valving means.

32. A fluid shock absorber for vehicles comprising a cylinder having a piston mounted therein providing compression chambers alternately under pressure in response to impact and recoil from road shocks, at least two valving means for controlling both impact and recoil, one of said valving means being adjustable to restrict fluid flow under compression, and a second of said valving means being thermostatically controlled.

33. In a shock absorber for a vehicle, a casing having compression chambers with pistons operating therein for both impact and recoil operations, a single discharge duct having means of communication with said chambers, and being arranged for flow of fluid in one direction only through said single discharge duct during both impact and recoil operations of the pistons, said duct having a discharge outlet, and thermostatically controlled means for regulating said outlet.

JOHN W. GRAY.